(12) United States Patent
Li et al.

(10) Patent No.: US 11,645,202 B2
(45) Date of Patent: May 9, 2023

(54) PARSING METHOD, PARSING APPARATUS, ELECTRONIC DEVICE, AND COMPUTER STORAGE MEDIUM

(71) Applicant: CHANGXIN MEMORY TECHNOLOGIES, INC., Hefei (CN)

(72) Inventors: Xiaolei Li, Hefei (CN); Baolei Han, Hefei (CN)

(73) Assignee: CHANGXIN MEMORY TECHNOLOGIES, INC., Hefei (CN)

(*) Notice: Subject to any disclaimer, the term of this patent is extended or adjusted under 35 U.S.C. 154(b) by 0 days.

(21) Appl. No.: 17/932,990

(22) Filed: Sep. 16, 2022

(65) Prior Publication Data
US 2023/0008332 A1  Jan. 12, 2023

Related U.S. Application Data

(63) Continuation of application No. PCT/CN2022/093307, filed on May 17, 2022.

(30) Foreign Application Priority Data

Jan. 21, 2022  (CN) .......................... 202210074588.X

(51) Int. Cl.
   *G06F 12/06*   (2006.01)
   *G06F 12/02*   (2006.01)
   *G06F 13/16*   (2006.01)

(52) U.S. Cl.
   CPC ...... *G06F 12/0653* (2013.01); *G06F 12/0238* (2013.01); *G06F 13/1689* (2013.01)

(58) Field of Classification Search
CPC ............. G06F 12/0238; G06F 12/0653; G06F 13/1689
See application file for complete search history.

(56) References Cited

U.S. PATENT DOCUMENTS

2020/0012600 A1* 1/2020 Konoth ............... G06F 11/1068
2021/0365268 A1* 11/2021 Manning ............. G06F 13/1668

FOREIGN PATENT DOCUMENTS

CN      104781885 A      7/2015

OTHER PUBLICATIONS

A Retrospective and Futurespective of Rowhammer Attacks and Defenses on DRAM by Zhang (Year: 2022).*

(Continued)

*Primary Examiner* — Paul M Knight
(74) *Attorney, Agent, or Firm* — Syncoda LLC; Feng Ma

(57) ABSTRACT

A parsing method includes the following: during parsing target bank, performing a row hammer operation on a logical row in target bank to determine a physical position relationship of the logical row; repeatedly performing the operation of performing the row hammer operation on the logical row in target bank to determine the physical position relationship of the logical row until all logical rows have been parsed; and determining a mapping relationship used for recording physical position relationships of multiple logical rows according to a linked list; where performing the row hammer operation on the logical row in target bank includes: acquiring a to-be-parsed logical row in target bank including multiple logical rows; performing the row hammer operation on the to-be-parsed logical row until at least one flipped logical row is obtained; and writing the at least one flipped logical row into the linked list.

20 Claims, 16 Drawing Sheets

(56) References Cited

OTHER PUBLICATIONS

One Bit Flips, One Cloud Flops: Cross-VM Row Hammer Attacks and Privilege Escalation by Xiao (Year: 2016).*
DRAMDig: A Knowledge-assisted Tool to Uncover DRAM Address Mapping by Wang (Year: 2020).*
How physical addresses map to rows and banks in DRAM by Seaborn (Year: 2015).*
Exploiting the DRAM rowhammer bug to gain kernel privileges by Seaborn (Year: 2015).*
DRAMA: Exploiting DRAM Buffers for Fun and Profit by Schwarz (Year: 2016).*
DRAMA: Exploiting DRAM Addressing for Cross-CPU Attacks by Pessl (Year: 2016).*
Achieving Reliable and Sustainable Next-Generation Memories by Kline (Year: 2017).*
Flipping Bits in Memory Without Accessing Them: An Experimental Study of DRAM Disturbance Errors by Kim (Year: 2014).*
Reverse Engineering of DRAMs: Row Hammer with Crosshair by Jung (Year: 2016).*
Reliable Reverse Engineering of Intel DRAM Addressing Using Performance Counters by Helm (Year: 2020).*
DReAM: Dynamic Re-arrangement of Address Mapping to Improve the Performance of DRAMs by Ghasempour (Year: 2015).*
Exploiting Embedded DDR HW vulnerabilities to overpass SW security: Rowhammer vulnerabilities and Potent Attacks under various Architecture by Fraile (Year: 2019).*
Software-only Reverse Engineering of Physical DRAM Mappings for Rowhammer Attacks by Barenghi (Year: 2018).*

* cited by examiner

US 11,645,202 B2

PARSING METHOD, PARSING APPARATUS, ELECTRONIC DEVICE, AND COMPUTER STORAGE MEDIUM

CROSS-REFERENCE TO RELATED APPLICATIONS

This application is a continuation application of International Patent Application No. PCT/CN2022/093307 filed on May 17, 2022, which claims priority to Chinese Patent Application No. 202210074588.X filed on Jan. 21, 2022. The disclosures of the above-referenced applications are hereby incorporated by reference in their entirety.

BACKGROUND

A Dynamic Random Access Memory (DRAM) may include a DRAM logical address and a DRAM physical address. The DRAM logical address is a logical address used inside the DRAM, and the DRAM physical address is a physical address used inside the DRAM. Currently, the DRAM logical address may be obtained by transforming an operating system physical address, and the DRAM logical address may be transformed to obtain an actual layout of a DRAM memory cell.

SUMMARY

The disclosure relates to, but not limited to, a parsing method, a parsing apparatus, an electronic device, and a computer storage medium.

According to a first aspect, embodiments of the disclosure provide a parsing method. The method includes that:

in a process of parsing a target bank, a row hammer operation is performed on a logical row in the target bank to determine a physical position relationship of the logical row;

the operation of performing the row hammer operation on the logical row in the target bank to determine the physical position relationship of the logical row is repeatedly performed until all of multiple logical rows have been parsed; and a mapping relationship is determined according to a linked list, the mapping relationship being used for recording physical position relationships of the multiple logical rows, where the operation of performing the row hammer operation on the logical row in the target bank to determine the physical position relationship of the logical row includes that:

a to-be-parsed logical row in the target bank is acquired, where the target bank includes multiple logical rows;

the row hammer operation is performed on the to-be-parsed logical row until at least one flipped logical row is obtained; and the at least one flipped logical row is written into the linked list.

According to a second aspect, the embodiments of the disclosure provide a parsing apparatus. The parsing apparatus includes a processor and a memory configured to store a computer-executable instruction. The processor is configured to:

in a process of parsing a target bank, perform a row hammer operation on a logical row in the target bank to determine a physical position relationship of the logical row; and repeatedly perform the operation of performing the row hammer operation on the logical row in the target bank to determine the physical position relationship of the logical row until all of multiple logical rows included in the target bank have been parsed;

determine a mapping relationship according to a linked list, the mapping relationship being used for recording physical position relationships of the multiple of logical rows, where the processor is further configured to:

acquire a to-be-parsed logical row in the target bank, where the target bank includes multiple logical rows;

perform the row hammer operation on the to-be-parsed logical row until at least one flipped logical row is obtained; and write the at least one flipped logical row into the linked list.

According to a third aspect, the embodiments of the disclosure provide a non-transitory computer storage medium having stored thereon a computer program that when executed by at least one processor, implements a parsing method. The method includes that:

in a process of parsing a target bank, a row hammer operation is performed on a logical row in the target bank to determine a physical position relationship of the logical row;

the operation of performing the row hammer operation on the logical row in the target bank to determine the physical position relationship of the logical row is repeatedly performed until all of multiple logical rows have been parsed; and a mapping relationship is determined according to a linked list, the mapping relationship being used for recording physical position relationships of the multiple logical rows, where the operation of performing the row hammer operation on the logical row in the target bank to determine the physical position relationship of the logical row includes that:

a to-be-parsed logical row in the target bank is acquired, where the target bank includes multiple logical rows;

the row hammer operation is performed on the to-be-parsed logical row until at least one flipped logical row is obtained; and the at least one flipped logical row is written into the linked list.

DETAILED DESCRIPTION

The following clearly and completely describes the technical solutions in the embodiments of the disclosure with reference to the accompanying drawings in the embodiments of the disclosure. It may be understood that the specific embodiments described herein are only used to explain the related disclosure but are not used to limit the disclosure. In addition, it further needs to be noted that only parts related to the disclosure are illustrated in the accompanying drawings for ease of description.

Unless otherwise defined, the technical terms and scientific terms used herein have the same meanings as how they are generally understood by a person skilled in the art to which the disclosure pertains. The terms used herein in are merely used for describing the disclosure, but are not intended to limit the disclosure.

In the following description, reference is made to "some embodiments", which describes a subset of all possible embodiments, but it may be understood that "some embodiments" may be the same subset or a different subset of all possible embodiments, and may be combined with each other without conflict.

It needs to be noted that references to the terms "first, second, and third" in the embodiments of the disclosure are only to distinguish similar objects and do not denote a specific order of objects. It may be understood that the terms "first, second, and third" can interchange the specific order or priority order where permitted, to enable embodiments of the disclosure described herein to be practiced in an order other than the order illustrated or described herein.

In computer addressing, a DRAM logical address is a logical address used inside a DRAM rather than an actual layout of a DRAM memory cell, whereas a DRAM physical address is an address used inside the DRAM, that is, an actual layout inside the DRAM.

It should be understood that there are four different addresses in the computer addressing: an operating system virtual address, an operating system physical address, a DRAM logical address, and a DRAM physical address. Specifically, FIG. 1 is a schematic diagram of address transform between an operating system and a DRAM according to an embodiment of the disclosure.

Figure 1:
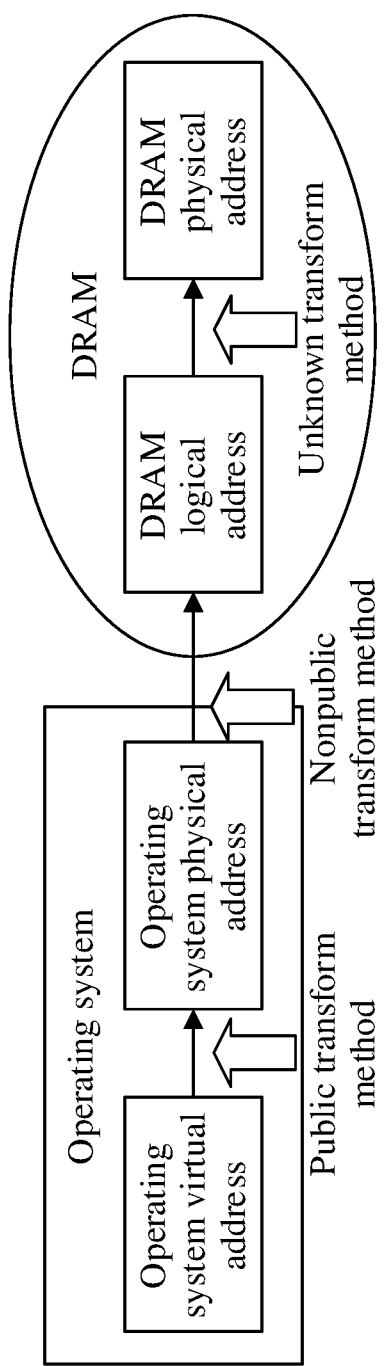
FIG. 1 is a schematic diagram of address transform between an operating system and a DRAM according to an embodiment of the disclosure.

As illustrated in FIG. 1, the operating system may include an operating system virtual address and an operating system physical address. The operating system virtual address is an address directly assigned and used by the operating system rather than an actual address of a memory cell. The operating system physical address is the actual address of the memory cell. The operating system virtual address may be transformed to obtain the operating system physical address, and the transform method is public.

As illustrated in FIG. 1, the DRAM may include a DRAM logical address and a DRAM physical address. The DRAM logical address is a logical address used inside the DRAM rather than an actual layout of a DRAM memory cell. The DRAM physical address is an address used inside the DRAM, and represents an actual layout inside the DRAM. Between the operating system and the DRAM, the operating system physical address may be transformed to obtain the DRAM logical address. Between the DRAM logical address and the DRAM physical address, the DRAM logical address may be transformed to obtain the DRAM physical address. However, the transform method is unknown.

In addition, a DRAM logical row (referred to as a logical row for short) is specifically a row obtained from the DRAM logical address, and a DRAM physical row (referred to as a physical row for short) is specifically a row obtained from the DRAM physical address. There exists one-to-one correspondences between the DRAM logical rows and the DRAM physical rows. That is, there is a mapping, but there is not necessarily a one-to-one mapping. That is, two adjacent logical rows are not necessarily two adjacent physical rows.

That is, the DRAM logical address may be transformed to obtain the DRAM physical address. However, the transform method is unknown, which results that a mapping relationship between the DRAM logical row and the DRAM physical row is uncertain.

Figure 2:
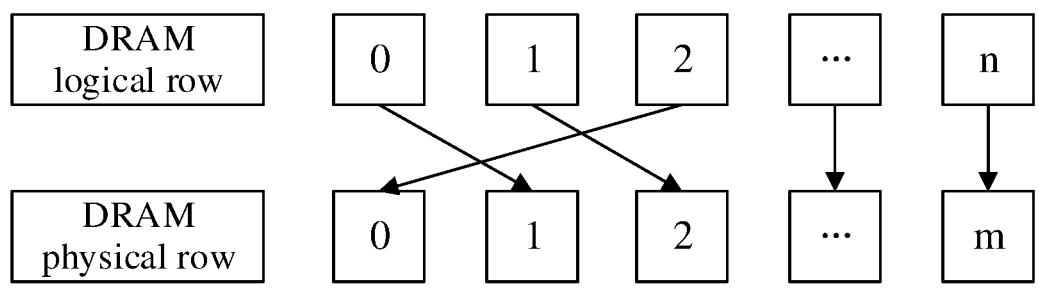
FIG. 2 is a schematic diagram of correspondences between DRAM logical rows and DRAM physical rows according to an embodiment of the disclosure.

For example, FIG. 2 is a schematic diagram of correspondences between DRAM logical rows and DRAM physical rows according to an embodiment of the disclosure. As illustrated in FIG. 2, there are DRAM logical rows 0, 1, 2, ..., and n in the DRAM logical address, and there are DRAM physical rows 0, 1, 2, ..., and n in the DRAM physical address. The logical row 0 corresponds to the physical row 1, the logical row 1 corresponds to the physical row 2, the logical row 2 corresponds to the physical row 0, and the logical row n corresponds to the physical row m. It can be seen that the DRAM logical row 0 does not necessarily correspond to the DRAM physical row 0.

At present, a technician may calculate an actual DRAM physical address from a DRAM logical address by studying circuit design scheme or layouts. However, generally, it is usually difficult to acquire a complete circuit layout. Due to the variety of layout designs, such methods has many problems such as low efficiency and easy to make mistakes. It can be seen that there is still no method that can efficiently implement the decoding of a correspondence between a DRAM logical row and a DRAM physical row at present.

Based on this, embodiments of the disclosure provide a parsing method. The basic concept of the method is as follows. In a process of parsing a target bank, a row hammer operation is performed on a logical row in the target bank to determine a physical position relationship of the logical row. The operation that a row hammer operation is performed on a logical row in the target bank to determine a physical position relationship of the logical row includes that: a to-be-parsed logical row in the target bank is acquired, where the target bank includes multiple logical rows; the row hammer operation is performed on the to-be-parsed logical row until at least one flipped logical row is obtained; and the at least one flipped logical row is written into the linked list. The operation of performing the row hammer operation on the logical row in the target bank to determine the physical position relationship of the logical row is repeatedly performed until all of multiple logical rows have been parsed. A mapping relationship is determined according to a linked list, the mapping relationship being used for recording physical position relationships of the multiple logical rows. In this way, based on the characteristic that a row hammer operation causes a row physically adjacent to a hammered row to flip, a row hammer operation is performed on a to-be-parsed logical row, and an obtained flipped logical row is written into a linked list, then a physical position relationship of a logical row of a memory can be obtained, thereby implementing accurate parsing of the physical position relationship of the logical row of the memory, so that the transform of a logical row of the memory into a physical row can be implemented.

The embodiments of the disclosure are described below in detail with reference to the accompanying drawings.

Figure 3:
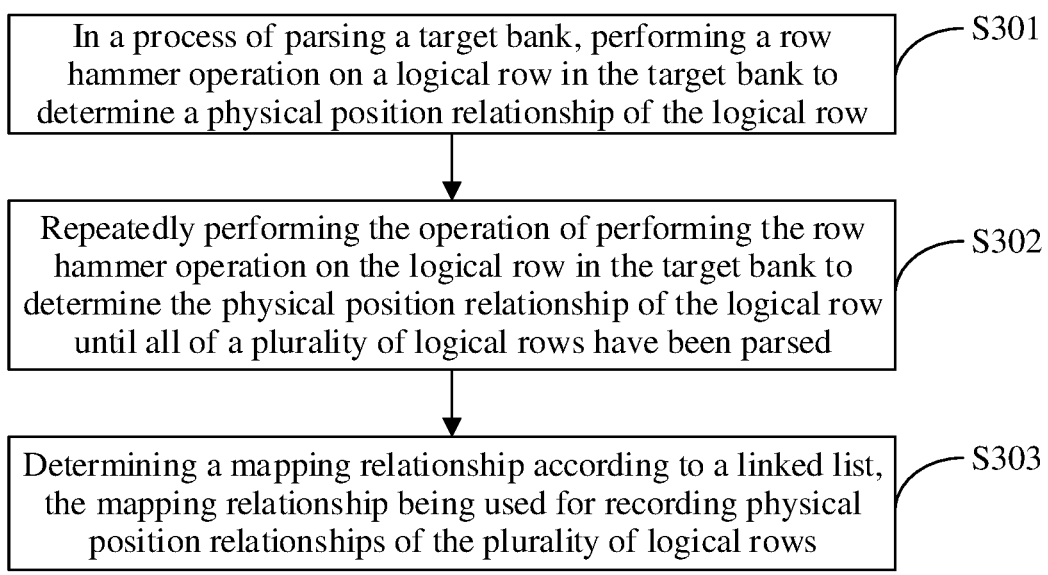
FIG. 3 is a first schematic flowchart of a parsing method according to an embodiment of the disclosure.

In an embodiment of the disclosure, FIG. 3 is a first schematic flowchart of a parsing method according to an embodiment of the disclosure. As illustrated in FIG. 3, the method may include the following operations.

In S301, in a process of parsing a target bank, a row hammer operation is performed on a logical row in the target bank to determine a physical position relationship of the logical row.

In S302, the operation of performing the row hammer operation on the logical row in the target bank to determine the physical position relationship of the logical row is repeatedly performed until all of multiple logical rows have been parsed.

In S303, a mapping relationship is determined according to a linked list, the mapping relationship being used for recording physical position relationships of the multiple logical rows.

It needs to be noted that the parsing method provided in the embodiments of the disclosure may be applied to a parsing apparatus or an electronic device integrated with the parsing apparatus. The electronic device may be implemented in various forms. For example, the electronic device may be a device with a storage function such as a computer, a smart phone, a tablet computer, a notebook computer, a palmtop computer, a Personal Digital Assistant (PDA), a navigation apparatus, a wearable device, a server, or a memory. This is not specifically limited.

It further needs to be noted that a memory is used as an example, and the parsing method provided in the embodiments of the disclosure is mainly applied to the parsing from a logical address to a physical address of a memory (for example, a DRAM), to implement the decoding of a logical row into a physical row in the memory. The memory may include at least one bank, and the target bank is any one of the at least one bank. Every bank in the memory is parsed by using the parsing method provided in the embodiments of the disclosure, to obtain a parsed result from a logical address to a physical address in the memory.

In the embodiments of the disclosure, for a process of parsing a target bank, a row hammer operation may be performed on a to-be-parsed logical row in the target bank to determine a physical position relationship of the logical row in the bank in terms of a physical address. This process is repeatedly performed until all of multiple logical rows in the target bank have been parsed. At this time, position relationships of all the logical rows in the target bank are all recorded in the linked list, so that a mapping relationship can be determined according to the linked list. The mapping relationship records the physical position relationships of the logical rows.

Figure 4:
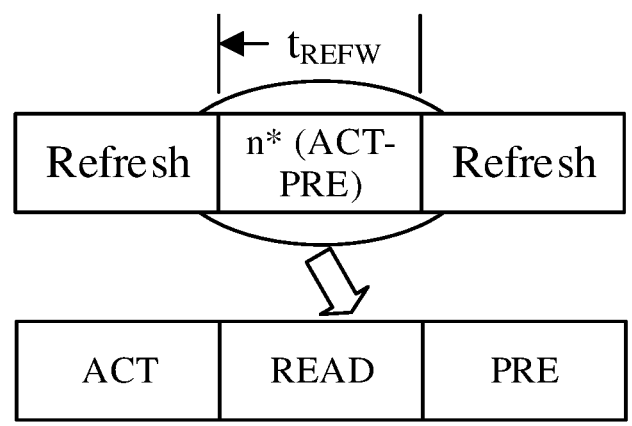
FIG. 4 is a schematic diagram of refreshing a memory row of a DRAM according to an embodiment of the disclosure.

It needs to be noted that Active-Precharge (ACT-PRE) may be an access operation of a DRAM physical row, including operations such as row activation (ACT), read or write, or precharge (PRE). FIG. 4 is a schematic diagram of refreshing a memory row of a DRAM according to an embodiment of the disclosure.

As illustrated in FIG. 4, due to structural principle of DRAM, the DRAM has a phenomenon of capacitive leakage, all memory rows need to be refreshed within a capacitance hold-up time tREFW. REFW represents a Refresh Window. At a high temperature, a refresh time is 32 milliseconds (ms). At a medium temperature, the refresh time is 64 ms. At a low temperature, the refresh time is 128 ms. n represents ACT-PRE or a command combination of multiple ACT-PREs.

Row Hammer is a vulnerability of a DRAM. When a DRAM physical address row of a DRAM keeps being ACT-PREed (that is, hammered) within a refresh period, a bit flip (referred to as a flip for short) occurs in the row adjacent to the DRAM physical address of this row. A hammered row is usually referred to as an aggressor row, and a row adjacent to the aggressor row is a victim row.

Figure 5:
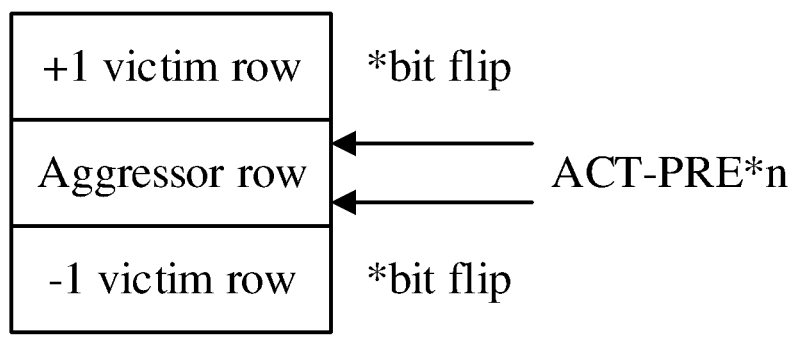
FIG. 5 is a first schematic diagram of a position relationship between an aggressor row and a victim row according to an embodiment of the disclosure.

FIG. 5 is a first schematic diagram of a position relationship between an aggressor row and a victim row according to an embodiment of the disclosure. As illustrated in FIG. 5, an aggressor row is hammered, and as a result the +1 victim row and the −1 victim row adjacent to the aggressor row are flipped.

Figure 6:
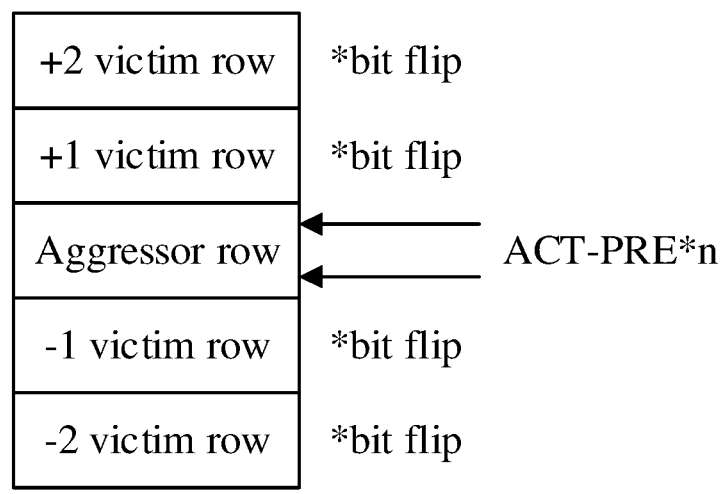
FIG. 6 is a second schematic diagram of a position relationship between an aggressor row and a victim row according to an embodiment of the disclosure.

In addition, when an aggressor row is hammered, multiple victim rows adjacent to the aggressor row may be flipped. FIG. 6 is a second schematic diagram of a position relationship between an aggressor row and a victim row according to an embodiment of the disclosure. As illustrated in FIG. 6, an aggressor row is hammered, and as a result the +1 victim row, the −1 victim row, the +2 victim row, and the −2 victim row adjacent to the aggressor row are all flipped.

With reference to FIG. 5 and FIG. 6, FIG. 5 shows a row hammer in a single-row mode. One aggressor row is attacked, and then two victim rows (the +1 row and the −1 row) adjacent to the aggressor row may be flipped. If two adjacent victim rows with a distance of 2 from the aggressor row are flipped (that is, a bit flip occurs in both the +2 victim row and the −2 victim row), the +1 victim row and the −1 victim row are definitely flipped, and flipped times of the ±1 rows is definitely greater than flipped times of the ±2 rows.

Based on the characteristic of row hammer, that is, the characteristic that when a row hammer operation is performed on a row, the rows adjacent to the physical address of this row are also flipped. Embodiments of the disclosure provide a method for decoding a relationship between a DRAM logical row and a DRAM physical row based on row hammer, to implement parsing a DRAM logical row to obtain a DRAM physical row. That is, by performing a row hammer operation on a logical row in the target bank to determine a physical position relationship of the logical row, and due to one target bank usually includes multiple logical rows, therefore, in the embodiments of the disclosure, the operation of performing the row hammer operation on the logical row in the target bank to determine the physical position relationship of the logical row is repeatedly performed until all of multiple logical rows have been parsed.

Figure 7:
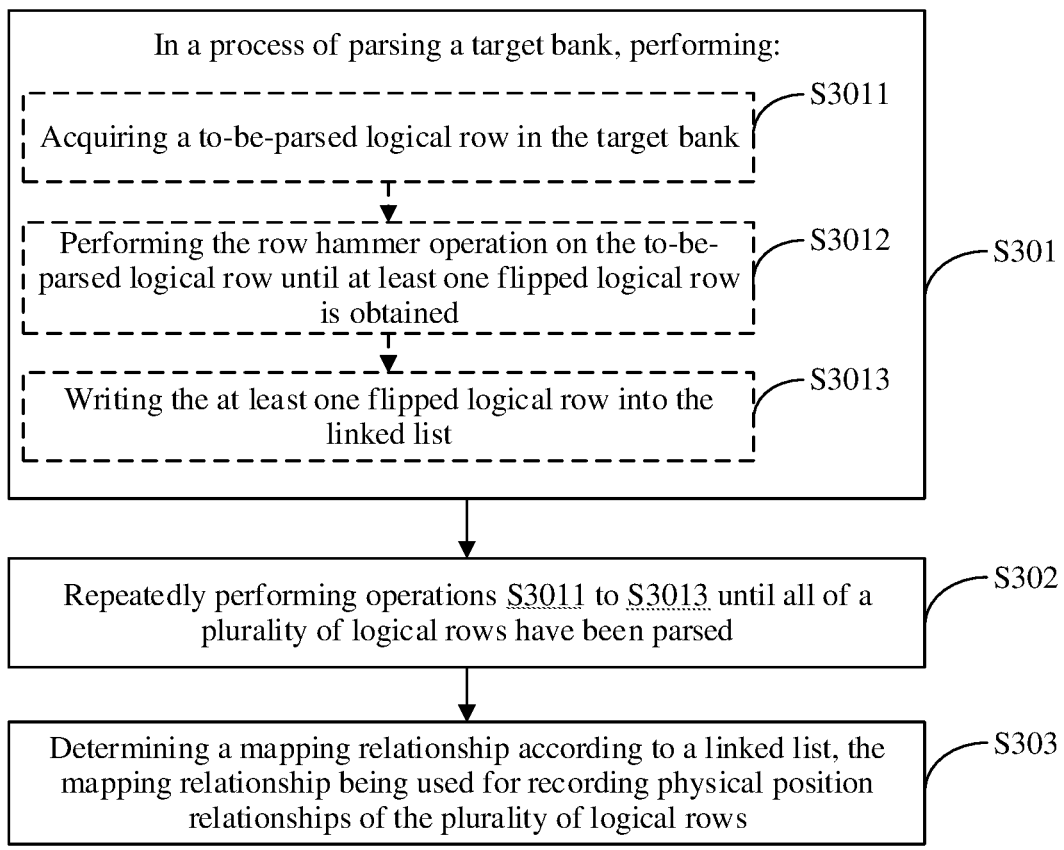
FIG. 7 is a detailed first schematic flowchart of a parsing method according to an embodiment of the disclosure.

In some embodiments, FIG. 7 is a detailed first schematic flowchart of a parsing method according to an embodiment of the disclosure. FIG. 7 is a detailed description of FIG. 3.

That is, operation S301 in FIG. 3 includes operations S3011 to S3013 in FIG. 7. As illustrated in FIG. 7, the detailed procedure may include the following operations.

In S301, in a process of parsing a target bank, the following operations are performed:

In S3011, a to-be-parsed logical row in the target bank is acquired.

In S3012, the row hammer operation is performed on the to-be-parsed logical row until at least one flipped logical row is obtained.

In S3013, the at least one flipped logical row is written into the linked list.

In S302, operations S3011 to S3013 are repeatedly performed until all of multiple logical rows have been parsed.

In S303, a mapping relationship is determined according to the linked list, the mapping relationship being used for recording physical position relationships of the multiple logical rows.

It needs to be noted that as illustrated in FIG. 7, the parsing method provided in the embodiments of the disclosure includes operations S301 to S303. For operation S301, the operation of performing a row hammer operation on a logical row in the target bank to determine a physical position relationship of the logical row may specifically include operations S3011 to S3013.

It further needs to be noted that the target bank may include multiple logical rows. First, a to-be-parsed logical row in the target bank is determined, then a row hammer operation is performed on the logical row in the foregoing manner until at least one flipped logical row is obtained, and the at least one flipped logical row is written into the linked list, so that a physical position relationship between the to-be-parsed logical row and the flipped logical row can be obtained, to complete the parsing for the to-be-parsed logical row.

Figure 8:
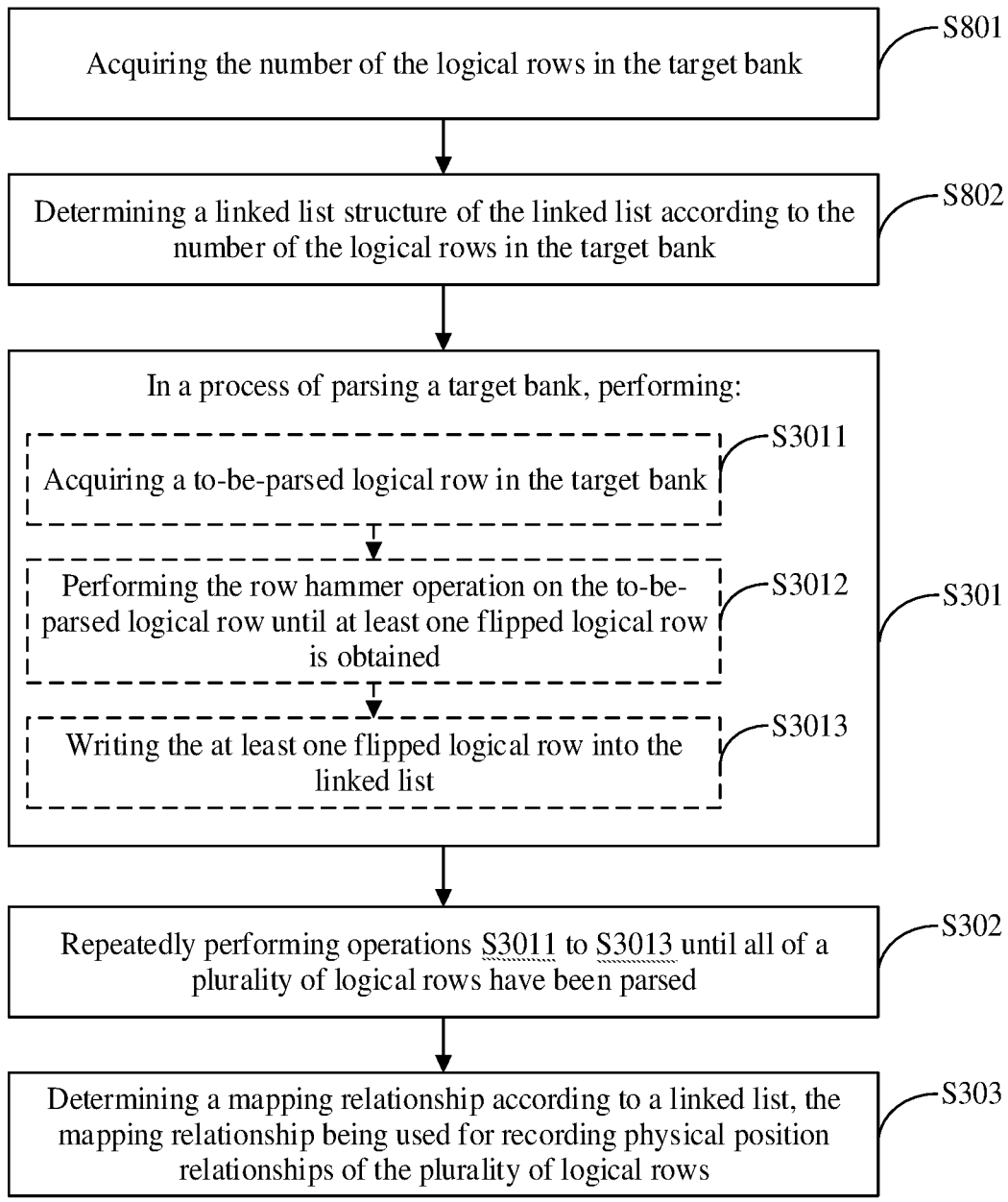
FIG. 8 is a detailed second schematic flowchart of a parsing method according to an embodiment of the disclosure.

It further needs to be noted that in the embodiments of the disclosure, the linked list may be used to store the physical position relationships of the logical rows. Therefore, in some embodiments, referring to FIG. 8 which is a detailed second schematic flowchart of a parsing method according to an embodiment of the disclosure. FIG. 8 is a further detailed description of FIG. 3 based on FIG. 7. As illustrated in FIG. 8, the detailed procedure may include the following operations.

In S801, the number of the logical rows in the target bank is acquired.

In S802, a linked list structure of the linked list is determined according to the number of the logical rows in the target bank.

In S301, in a process of parsing a target bank, the following operations are performed:

In S3011, a to-be-parsed logical row in the target bank is acquired.

In S3012, the row hammer operation is performed on the to-be-parsed logical row until at least one flipped logical row is obtained.

In S3013, the at least one flipped logical row is written into the linked list.

In S302, operations S3011 to S3013 are repeatedly performed until all of multiple logical rows have been parsed.

In S303, a mapping relationship is determined according to the linked list, the mapping relationship being used for recording physical position relationships of the multiple logical rows.

It needs to be noted that during the parsing of the target bank, the number of the logical rows in the target bank is first acquired, and then a linked list structure of the linked list is determined according to the number of the logical rows in the target bank. That is, the linked list is first initialized. The linked list includes multiple nodes, and the number of the multiple nodes is identical to the number of the logical rows in the target bank. Operations S301 and S302 are then performed to complete the parsing for the target bank.

Figure 9:
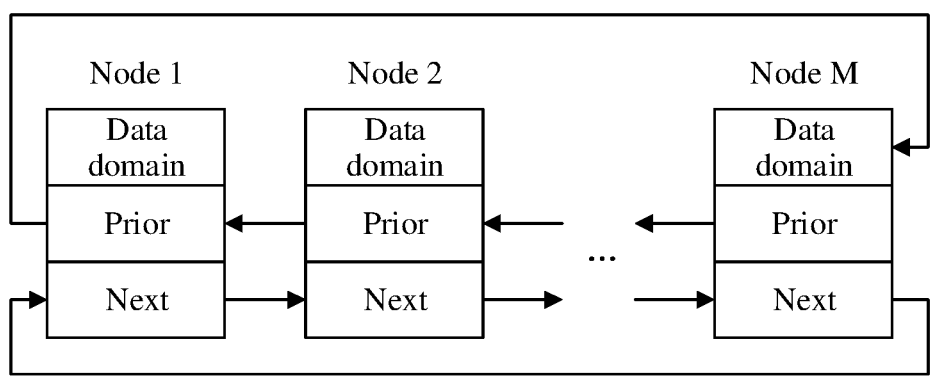
FIG. 9 is a schematic structural diagram of a linked list according to an embodiment of the disclosure.

FIG. 9 is a schematic structural diagram of a linked list according to an embodiment of the disclosure. Each element in the linked list is referred to as a node. The linked list is formed by a series of nodes. FIG. 9 illustrates a linked list including M nodes (node 1, node 2, . . . , and node M). The linked list includes multiple nodes. The number of the multiple nodes is identical to the number of the logical rows in the target bank. Each node includes three parts: the first part is a data domain storing a data element (a row address of a DRAM logical row is saved here); the second part is a pointer domain storing an address of a previous node, and is referred to as a Prior; and the third part is a pointer domain storing an address of a next node, and is referred to as a Next. The content stored in a data domain of a node may be dynamically generated during running. The data domain of each node in the entire linked list and the order of the node in the linked list are a mapping relationship between a DRAM logical row and a DRAM physical row.

In the embodiments of the disclosure, the linked list structure of the linked list is determined according to the number of the logical rows in the target bank. The number of nodes in the linked list is the number of the logical rows in the target bank. The data domain of each node is used for saving a row address of a logical row. That is, after the linked list structure is determined, the order of the nodes in the linked list is fixed. Through subsequent operations, the row address of the logical row is written in a data domain of a corresponding node, so that the physical position relationships of the logical rows are recorded through the linked list.

It further needs to be noted that in the embodiments of the disclosure, a preset stack may be used to store a logical row that needs to be parsed. A stack is a Last-In-First-Out linear table data structure with limited operation. Addition and deletion operations of the stack can only be performed at one end which is called as a stack top, while another end is called as a stack bottom. Inserting a new element into a stack is also referred to as in-stack, push, or pop down, that is, a new element is placed at the top of a stack top element, to make the new element a new stack top element. Deleting an element from a stack is also referred to as out-stack or pop, that is, a stack top element is deleted, to make an adjacent element as a new stack top element.

Figure 10:
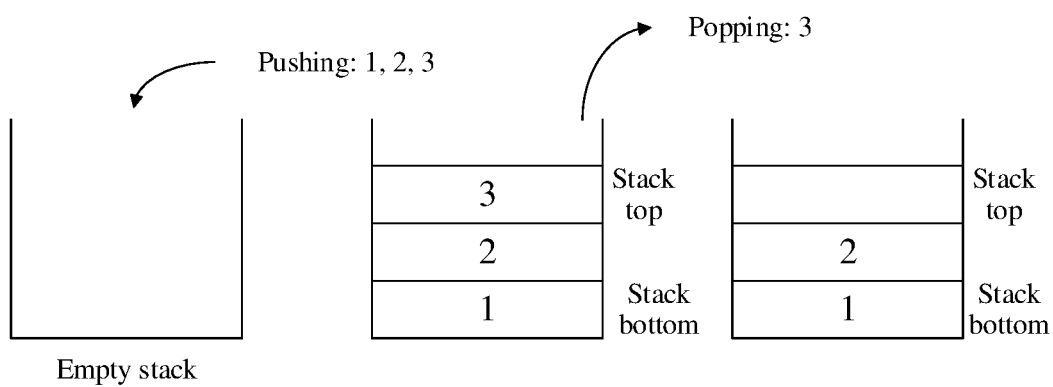
FIG. 10 is a schematic diagram of a process of pushing/popping an element according to an embodiment of the disclosure.

For example, referring to FIG. 10, FIG. 10 is a schematic diagram of a process of pushing/popping an element according to an embodiment of the disclosure. As illustrated in FIG. 10, in the left figure of FIG. 10, the stack is in an empty stack state. Then elements 1, 2, and 3 are sequentially pushed onto a stack top, so that from a stack bottom to the stack top, the elements are sequentially 1, 2, and 3, as illustrated in the middle figure of FIG. 10. In this case, the element 1 is a stack bottom element, and the element 3 is a stack top element. The stack top element of the stack is popped from the stack. That is, the element 3 is popped from the stack. After the stack top element 3 is popped from the stack, the element 2 becomes the new stack top element, as illustrated in the right figure of FIG. 10.

In some embodiments, when a preset stack is used to store a logical row that needs to be parsed, the operation of acquiring a to-be-parsed logical row in the target bank may include that:

a stack top element is popped from a preset stack to acquire the to-be-parsed logical row in the target bank, where the stack top element represents the to-be-parsed logical row in the target bank.

It needs to be noted that during the acquisition of a to-be-parsed logical row in the target bank, the stack top element of the preset stack is popped from the stack. In this case, the popped element is the to-be-parsed logical row in the target bank.

Further, in some embodiments, in case that the to-be-parsed logical row is the first parsed logical row in the target bank, before popping a stack top element from a preset stack to acquire the to-be-parsed logical row in the target bank, the method may further include that:

after the preset stack is initialized, one logical row is randomly selected from the target bank as the to-be-parsed logical row, and pushing this to-be-parsed logical row onto a stack top of the preset stack.

It needs to be noted that for the first parsed logical row in the target bank, a manner of determining the to-be-parsed logical row is that: after the preset stack is initialized, one logical row is randomly selected from the target bank as the to-be-parsed logical row, and the randomly selected to-be-parsed logical row is pushed onto a stack top of the preset stack. Next, in the process of parsing the target bank, the to-be-parsed logical row is popped from the preset stack, to perform subsequent operations.

It further needs to be noted that for a logical row that is not the first parsed to-be-parsed logical row in the target bank, in some embodiments, in a process of writing the at least one flipped logical row into the linked list, the method may further include that:

the flipped logical row written into the linked list is pushed onto a stack top of the preset stack.

It needs to be noted that in the embodiments of the disclosure, in case that the flipped logical row is written into the linked list, the flipped logical row written into the linked list is further pushed onto the stack top of the preset stack. In this way, every time one flipped logical row is written into the linked list, the flipped logical row will be added to the preset stack, so that during the parsing of a next logical row, it is only necessary to pop a stack top element from the preset stack to obtain a to-be-parsed logical row, and it is no need to perform a selection from multiple logical rows of the target bank, thereby implementing the parsing of a logical row in the target bank.

In this way, in the embodiments of the disclosure, a to-be-parsed logical row may be acquired based on the preset stack, and after the to-be-parsed logical row is acquired, a row hammer operation is performed on the to-be-parsed logical row, until at least one flipped logical row is obtained.

That is, in case that a row hammer operation is performed on the to-be-parsed logical row, each time of hammering does not necessarily cause adjacent rows of the to-be-parsed logical row to flip. Therefore, after the row hammer operation is performed on the to-be-parsed logical row, if the number of logical rows that are flipped is zero, a row hammer operation continues to be performed on the to-be-parsed logical row until at least one flipped logical row is obtained. The at least one flipped logical row is a logical row adjacent to physical address of the to-be-parsed logical row.

It may be understood that during performing the row hammer operation, the to-be-parsed logical row is the foregoing aggressor row, and the flipped logical row is the foregoing victim row.

In addition, the embodiments of the disclosure further provide a method for checking whether a logical row is flipped. In some embodiments, before the target bank is parsed, the method may further include that:

preset data is separately written into the multiple logical rows, where the preset data is used for determining whether the logical row is flipped.

It needs to be noted that before the target bank is parsed, preset data is written in advance for the multiple logical rows of the target bank, to determine whether the logical rows are flipped after the row hammer operation is performed. The preset data is usually some data values that are easy to detect. Before the row hammer operation is performed, the preset data is written into a logical row, and if a bit flip occurs in this logical row, the value of the preset data changes. Whether the preset data of other logical rows, except the to-be-parsed logical row, are equal before and after the row hammer operation is performed on the to-be-parsed logical row can check whether a bit flip occurs in these logical rows.

In this way, through writing the preset data in the logical rows in advance, whether the logical rows are flipped can be accurately checked, so that during the determination of the physical position relationships of the logical rows, a transform result is accurate.

After at least one flipped logical row is obtained, the at least one flipped logical row is written into the linked list.

In some embodiments, the operation of writing the at least one flipped logical row into the linked list may include that:

in case that the at least one flipped logical row includes only a first flipped logical row, the first flipped logical row is written into the linked list by using a first parsing strategy; or in case that the at least one flipped logical row includes at least a first flipped logical row and a second flipped logical row, the first flipped logical row and the second flipped logical row are written into the linked list by using a second parsing strategy.

It needs to be noted that for the at least one flipped logical row obtained by performing the row hammer operation on the to-be-parsed logical row, the number of the at least one flipped logical row may be one or more. In case that the number of the at least one flipped logical row is one (that is, only one first flipped logical row is included), the first flipped logical row is written into the linked list by using the first parsing strategy.

In case that the number of the at least one flipped logical row is greater than one (that is, at least a first flipped logical row and a second flipped logical row are included), the first flipped logical row and the second flipped logical row are written into the linked list by using a second parsing strategy.

It further needs to be noted that the two first flipped logical rows discussed above do not necessarily represent two identical logical rows, which are mainly used for describing the number of logical rows in which a bit flip occurs.

For the first parsing strategy, in some embodiments, the operation of writing the first flipped logical row into the linked list by using a first parsing strategy may include that:

in case that the first flipped logical row does not exist in the linked list, a node corresponding to the to-be-parsed logical row in the linked list is determined as a to-be-parsed node;

whether a next node of the to-be-parsed node is empty is determined; and in case that the next node of the to-be-parsed node is empty, a row address of the first flipped logical row is written into the next node of the to-be-parsed node; or in case that the next node of the to-be-parsed node is not empty, a row address of the first flipped logical row is written into a prior node of the to-be-parsed node.

It needs to be noted that if the at least one flipped logical row includes only one first flipped logical row and the first flipped logical row does not exist in the linked list, the first flipped logical row needs to be written into the linked list.

Specifically, a node corresponding to the to-be-parsed logical row in the linked list is determined as a to-be-parsed node, and whether a next node of the to-be-parsed node is empty is determined. In case that the next node is not empty, it indicates that the to-be-parsed node already has a next node. In this case, a row address of the first flipped logical row is written into a prior node of the to-be-parsed node. In case that the next node of the to-be-parsed node is empty, it indicates that the to-be-parsed node does not have a next node, and thus a row address of the first flipped logical row is written into the next node of the to-be-parsed node. Next, the process returns to parse a next to-be-parsed logical row, until all the logical rows in the target bank have been parsed.

That is, writing the first flipped logical row into the linked list refers to writing the row address of the first flipped logical row into the prior node or the next node of the to-be-parsed node. Specifically, the row address of the first flipped logical row is written into a data domain of the prior node or the next node of the to-be-parsed node.

In this way, for a logical row represented by each node in the linked list, a prior node or a next node of this logical row is a node of a logical row adjacent to the logical row represented by each node in physical address, so that an order relation of the nodes in the linked list is an order relation of physical rows corresponding to the logical rows, thereby implementing the decoding of the physical position relationships of the logical rows.

It further needs to be noted that the to-be-parsed node is a node corresponding to the to-be-parsed logical row in the linked list. That is, before the to-be-parsed logical row is parsed, the to-be-parsed logical row has already been written into the linked list.

For the to-be-parsed logical row (which is first parsed) in the target bank, this to-be-parsed logical row is pushed onto the stack top of the preset stack, the row address of this to-be-parsed logical row is written into a node in the linked list at the same time. This node may be any node in the linked list. In a process of parsing the first to-be-parsed logical row, this node is used as the to-be-parsed node.

In addition, after the row address of the first flipped logical row is written into the next node or the prior node of the to-be-parsed node, the first flipped logical row is pushed onto the stack top of the preset stack at the same time. In this way, after the to-be-parsed logical row has been parsed, the process needs to return to parse a next to-be-parsed logical row. The next to-be-parsed logical row is the stack top element of the preset stack, that is, the first flipped logical row.

Therefore, for a logical row that is not the to-be-parsed logical row which is first parsed in the target bank, the logical row has been written into the linked list before being determined as a to-be-parsed logical row, that is, a node corresponding to this to-be-parsed logical row already exists in the linked list.

In addition, in some embodiments, in case that the at least one flipped logical row includes only the first flipped logical row and the first flipped logical row does not exist in the linked list, the method may further include that:

hammering times of performing the row hammer operation on the to-be-parsed logical row is counted;

whether the hammering times is greater than or equal to a preset threshold is determined, where the preset threshold is maximum hammering times of performing the row hammer operation on the to-be-parsed logical row; and in case that the hammering times is less than the preset threshold, the operation of performing the row hammer operation on the to-be-parsed logical row is continued to be performed until at least one flipped logical row is obtained; or in case that the hammering times is greater than or equal to the preset threshold, the operation of acquiring a to-be-parsed logical row in the target bank is returned to be performed.

It needs to be noted that, in case that the at least one flipped logical row includes only the first flipped logical row, the first flipped logical row may already exist in the linked list. In this case, it is not necessary to write the first flipped logical row into the linked list. Because there is only one adjacent logical row (unless specifically stated, "adjacent" refers to "physically adjacent") for the first logical row and the last logical row in terms of a physical position, and if there is only one flipped logical row, it indicates that the to-be-parsed logical row may be a logical row located at a boundary or there may be a mis-determination caused by operational errors or the like.

Therefore, in the embodiments of the disclosure, a preset threshold is set to improve the fault tolerance rate of determining whether a to-be-parsed logical row is a boundary logical row. The preset threshold represents maximum times of performing a row hammer operation on the to-be-parsed logical row, and is used in case that there is one flipped logical row.

In case that the hammering times is less than the preset threshold, the row hammer operation on the to-be-parsed logical row is continued to be performed until at least one flipped logical row is obtained. In case that the hammering times is greater than or equal to the preset threshold, it indicates that the hammering times for the to-be-parsed logical row already reaches the maximum times, and the process returns to acquire a next to-be-parsed logical row, to parse the next to-be-parsed logical row.

In this way, in case that there is only one flipped logical row and this flipped logical row already exists in the linked list, whether it is necessary to continue to perform the row hammer operation on the to-be-parsed logical row is determined by comparing an accumulated hammering times and the preset threshold, thereby avoiding a mis-determination caused by various factors, and improving the accuracy of determining whether a to-be-parsed logical row is a boundary logical row.

For the second parsing strategy, in some embodiments, the first flipped logical row and the second flipped logical row are two logical rows with the largest flipped times in the at least one flipped logical row, and the flipped times of the first flipped logical row is greater than or equal to the flipped times of the second flipped logical row; and correspondingly, the operation of writing the first flipped logical row and the second flipped logical row into the linked list by using a second parsing strategy may include that:

whether the first flipped logical row exists in the linked list is determined;

in case that the first flipped logical row does not exist in the linked list, the first flipped logical row is written into the linked list;

in case that the first flipped logical row exists in the linked list, whether the second flipped logical row exists in the linked list is determined; and in case that the second flipped logical row does not exist in the linked list, the second flipped logical row are written into the linked list.

It needs to be noted that in case that there are more than one flipped logical row, two logical rows with the largest flipped times are selected from multiple flipped logical rows as the first flipped logical row and the second flipped logical row. As can be known from the characteristic of row hammer, the flipped times of a flipped logical row that is the closest to the to-be-parsed logical row is definitely greater than the flipped times of a flipped logical row that is the second closest to or farther way from the to-be-parsed logical row.

In this way, the first flipped logical row and the second flipped logical row are physically adjacent rows of the to-be-parsed logical row, so that a physical position relationship between the logical rows can be obtained more accurately.

It further needs to be noted that in the embodiments of the disclosure, the flipped logical row with the larger flipped times in the two flipped logical rows is written into a next node of the to-be-parsed logical row. Therefore, the flipped times of the first flipped logical row is greater than or equal to the flipped times of the second flipped logical row. In a process of writing the first flipped logical row and the second flipped logical row into the linked list, it is first determined whether the first flipped logical row exists in the linked list. If yes, it is determined whether the second flipped logical row exists in the linked list. If the second flipped logical row does not exist in the linked list, the first flipped logical row is first written into the linked list, and then it is determined whether the second flipped logical row exists in the linked list.

The determination for the second flipped logical row is similar. If the second flipped logical row does not exist in the linked list, the second flipped logical row is written into the linked list. If second flipped logical row exists in the linked list, the process returns to parse a next to-be-parsed logical row, until all the logical rows in the target bank have been parsed.

In some embodiments, the operation of writing the first flipped logical row into the linked list may include that:

a node corresponding to the to-be-parsed logical row in the linked list is determined as a to-be-parsed node;

whether a next node of the to-be-parsed node is empty is determined; and in case that the next node of the to-be-parsed node is empty, a row address of the first flipped logical row is written into the next node of the to-be-parsed node; or in case that the next node of the to-be-parsed node is not empty, a row address of the first flipped logical row is written into a prior node of the to-be-parsed node.

In some embodiments, the operation of writing the second flipped logical row into the linked list may include that:

a node corresponding to the to-be-parsed logical row in the linked list is determined as a to-be-parsed node;

whether a next node of the to-be-parsed node is empty is determined; and in case that the next node of the to-be-parsed node is empty, a row address of the second flipped logical row is written into the next node of the to-be-parsed node; or in case that the next node of the to-be-parsed node is not empty, a row address of the second flipped logical row is written into a prior node of the to-be-parsed node.

It needs to be noted that a manner of writing the first/second flipped logical row into the linked list is the same as the foregoing manner of writing the first flipped logical row into the linked list. Details are not described herein again.

It needs to be noted that after the first/second flipped logical row is written into the linked list, the first/second flipped logical row still needs to be pushed onto the stack top of the preset stack. If both the first flipped logical row and the second flipped logical row are written into the linked list, the first flipped logical row and the second flipped logical row are both pushed onto the preset stack. At this time, because the first flipped logical row is first determined and written into the linked list, the first flipped logical row is first pushed onto the preset stack. The second flipped logical row is pushed onto the preset stack after the first flipped logical row. In this case, the stack top element of the preset stack is the second flipped logical row. Therefore, a to-be-parsed logical row which is next parsed is the stack top element of the preset stack, that is, the second flipped logical row.

It can be seen that in the disclosure, each flipped logical row is written into the linked list, and is pushed onto the preset stack at the same time. In this way, for the parsing of the target bank, it is only necessary to a logical row is randomly selected from the target bank when determining the first to-be-parsed logical row. For a subsequent to-be-parsed logical row, it is only necessary to pop the stack top element from the preset stack without performing a selection from the target bank, thereby completing the parsing for all of the logical rows in the target bank.

After all of the logical rows in the target bank have been parsed, the linked list storing the physical position relationships of the logical rows can be obtained. A mapping relationship is determined according to the linked list, the mapping relationship is used for recording physical position relationships of the multiple logical rows, thereby implementing the decoding for the physical position relationships of the logical rows.

In some embodiments, the operation of determining a mapping relationship according to the linked list may include that:

an output file is set; and the linked list is traversed to the output file, to obtain a target file in the target bank, where the target file stores the physical position relationships of the multiple logical rows recorded in the mapping relationship.

It needs to be noted that during the determination of the mapping relationship according to the linked list, an output file may be set, and the linked list is traversed to the output file, to obtain a target file in the target bank. The target file stores the physical position relationships of the multiple logical rows recorded in the mapping relationship.

The method provided in the embodiments of the disclosure may be applied to a memory including at least one bank. In some embodiments, the target bank is any one of the at least one bank. The method may further include that:

whether all of the at least one bank have been parsed is determined;

in case that all of the at least one bank have been parsed, target files of all the banks are saved;

in case that unparsed bank(s) exist(s) in the at least one bank, a target bank is determined from the unparsed bank(s), and the operation of performing the row hammer operation on the logical row in the target bank to determine the physical position relationship of the logical row is returned to be performed until all of the at least one bank have been parsed.

It needs to be noted that after the target bank has been parsed, it is determined whether all of the banks in the memory have been parsed. If all of the banks in the memory have been parsed, target files of all banks are saved. That is, the physical position relationships of all logical rows in each bank in the memory are saved. If there exists unparsed banks, a target bank is determined from the unparsed banks, and the target bank is parsed in the foregoing manner, until all banks have been parsed.

Embodiments of the disclosure provide a parsing method, including that: in a process of parsing a target bank, a row hammer operation is performed on a logical row in the target bank to determine a physical position relationship of the logical row; the operation of performing the row hammer operation on the logical row in the target bank to determine the physical position relationship of the logical row is repeatedly performed until all of multiple logical rows have been parsed; and a mapping relationship is determined according to a linked list, the mapping relationship being used for recording physical position relationships of the multiple logical rows, where the operation of performing the row hammer operation on the logical row in the target bank to determine the physical position relationship of the logical row includes that: a to-be-parsed logical row in the target bank is acquired, where the target bank includes the multiple logical rows; the row hammer operation is performed on the to-be-parsed logical row until at least one flipped logical row is obtained; and the at least one flipped logical row is written into the linked list. In this way, based on the characteristic that a row hammer operation causes a row physically adjacent to a hammered row to flip, a row hammer operation is performed on a to-be-parsed logical row, and an obtained flipped logical row is written into a linked list, then a physical position relationship of a logical row of a memory can be obtained, thereby implementing accurate parsing of the physical position relationship of the logical row of the memory, so that the transform of a logical row of the memory into a physical row can be implemented.

Figure 11:
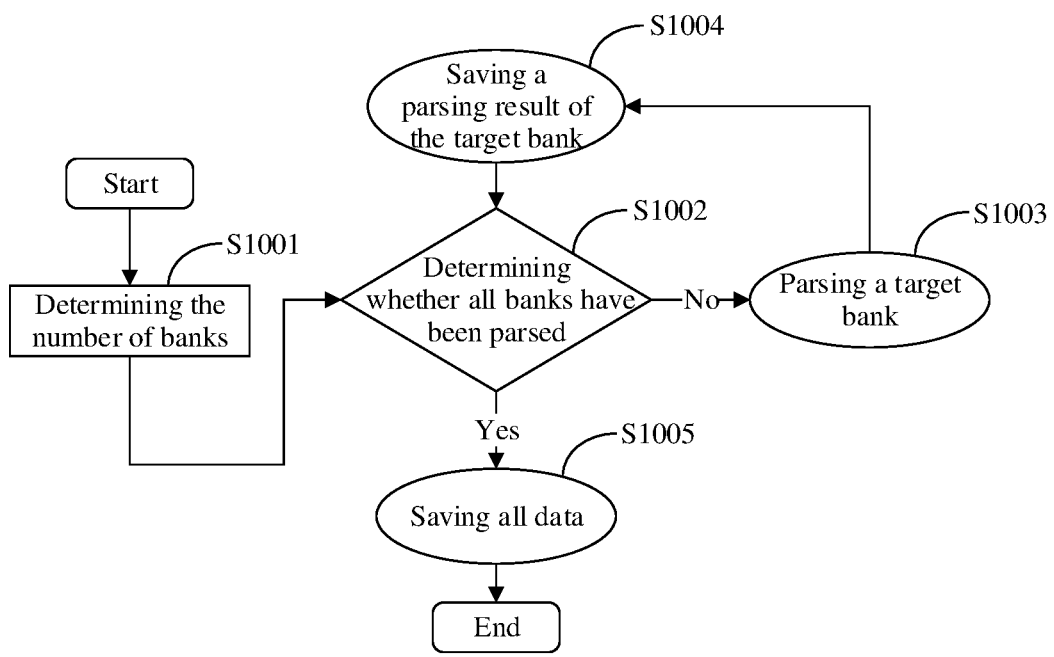
FIG. 11 is a second schematic flowchart of a parsing method according to an embodiment of the disclosure.

In another embodiment of the disclosure, referring to FIG. 11, FIG. 11 is a second schematic flowchart of a parsing method according to the disclosure. As illustrated in FIG. 11, the method may include the following operations.

In S1001, the number of banks is determined.

It needs to be noted that after a parsing algorithm is started, a total number of banks in a memory is first acquired.

In S1002, it is determined whether all banks have been parsed.

It needs to be noted that in case that a determination result is yes, that is, all banks in the memory have been parsed, operation S1005 is performed. In case that a determination result is no, that is, there exists an unparsed bank, operation S1003 is performed.

In S1003, a target bank is parsed.

It needs to be noted that in case that there exists unparsed banks in the memory, a target bank is determined from the unparsed banks, and the target bank is parsed.

Simply put, the parsing for a target bank mainly includes repeatedly performing the following operations.

(1) A row hammer operation is performed to attack a to-be-parsed logical row, to obtain one or two (or more) flipped logical rows in which a bit flip occurs, and the flipped logical row(s) is written into a linked list.

The flipped logical row and the attacked logical row are physically adjacent.

(2) Operation (1) is repeatedly performed until the number of parsed logical rows is equal to the total number of the logical rows in the target bank.

(3) A parsing result of the to-be-parsed logical row is saved.

Because the physical position relationship of the logical row in the target bank is saved in the disclosure, and an adjacency relationship of nodes in the linked list is mapped to an adjacency relationship between physical rows in physical addresses, the parsing result may also be understood as a result of parsing from a logical row to a physical row.

In S1004, a parsing result of the target bank is saved.

It needs to be noted that after the target bank has been parsed, the parsing result of the target bank is saved. That is, results of parsing from all logical rows to physical rows of the target bank are saved.

In S1005, all data are saved.

It needs to be noted that after all banks in the memory have been parsed, all data are saved, and the algorithm is ended.

It further needs to be noted that the foregoing operations S1001 to S1005 are only a general description of the parsing method. For an implementation process of operations S1003, S1004, and S1005, further detailed description is provided.

Figure 12:
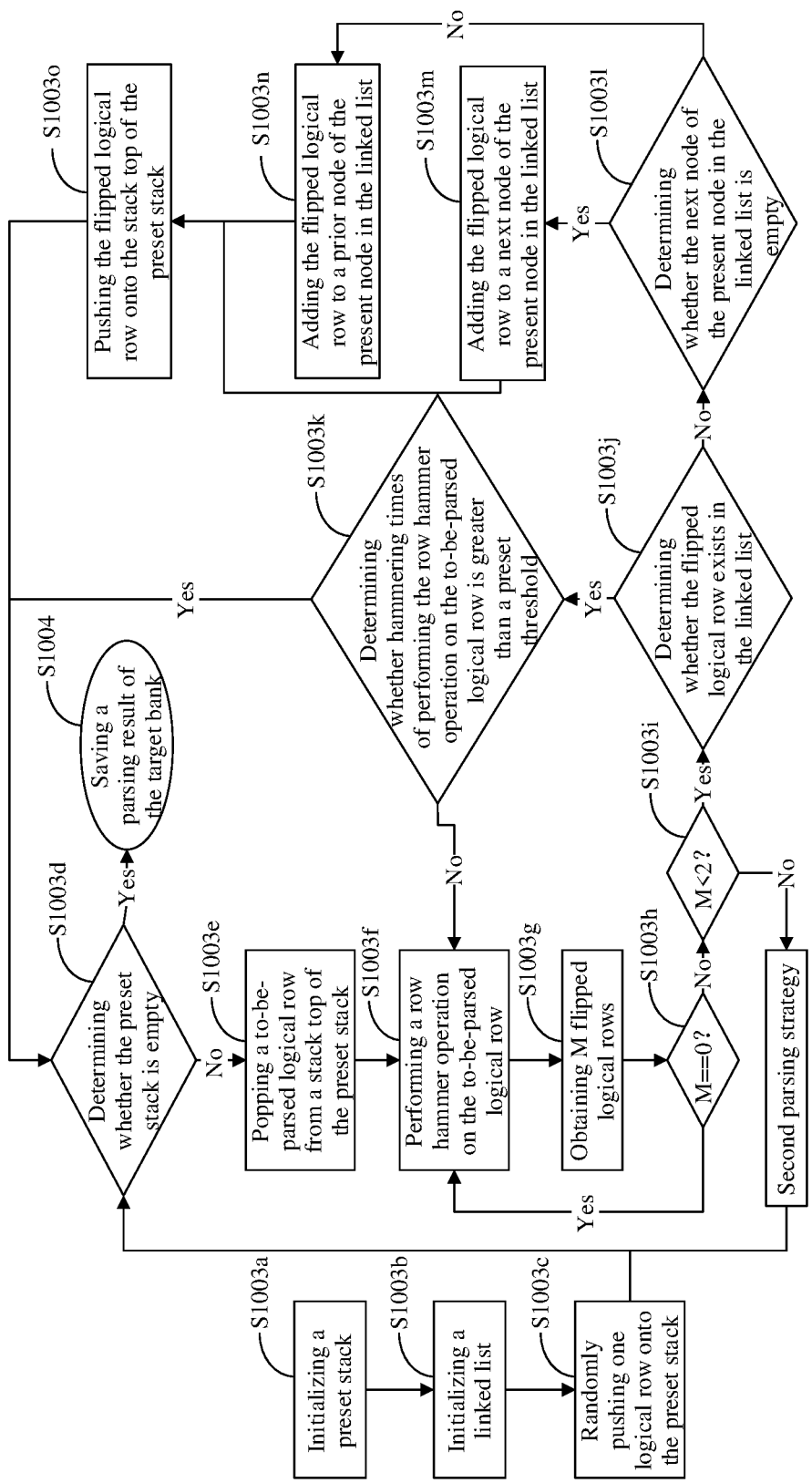
FIG. 12 is a detailed third schematic flowchart of a parsing method according to an embodiment of the disclosure.

For operation S1003, referring to FIG. 12, FIG. 12 is a detailed third schematic flowchart of a parsing method according to the disclosure. The detailed procedure is a detailed description of operation S1003. As illustrated in FIG. 12, the detailed procedure may include the following operations.

In S1003a, a preset stack is initialized.

In S1003b, a linked list is initialized.

It needs to be noted that during the parsing for the target bank, N logical rows that need to be parsed can be acquired according to the target bank, and the N logical rows are stored in an array. In addition, preset data may be further written for each logical row and is used for checking whether the logical row is flipped. N represents the number of the logical rows in the target bank.

The preset stack is initialized to be empty, and the linked list is initialized, to determine a linked list structure of the linked list. For the preset stack, in the embodiments of the disclosure, the number of elements does not exceed 3, thereby ensuring the implementation of the depth traversal of the logical rows.

The preset stack is used for storing a logical row that is to be parsed. The linked list is used for saving the physical position relationship (that is, a physical order relationship) of the logical row.

In S1003c, one logical row is randomly pushed onto the preset stack.

It needs to be noted that the first logical row (which is parsed) in the target bank is randomly determined. One logical row may be randomly determined from the foregoing array and pushed onto the preset stack. The randomly determined logical row is the first to-be-parsed logical row in the target bank.

It further needs to be noted that for the first logical row (which is parsed), this logical row is pushed onto the preset stack, and further needs to be written into the linked list at the same time. That is, a row address of this logical row is written into a data domain of a node in the linked list, to generate a node corresponding to this logical row in the linked list.

In S1003d, it is determined whether the preset stack is empty.

It needs to be noted that in case that a determination result is yes, that is, the preset stack is empty, it indicates that all of the logical rows in the target bank have been parsed, and then the foregoing operation S1004 is performed to save the parsing result of the target bank.

In case that the determination result is no, that is, the preset stack is not empty, it indicates that unparsed logical rows exist in the target bank, then operation S1003e is performed.

In S1003e, a to-be-parsed logical row is popped from a stack top of the preset stack.

It needs to be noted that when popping the stack top element from the preset stack, the popped stack top element is the to-be-parsed logical row.

In S1003f, a row hammer operation is performed on the to-be-parsed logical row.

In S1003g, M flipped logical rows are obtained.

In S1003h, it is determined whether M is equal to 0.

It needs to be noted that M flipped logical rows can be obtained by performing the row hammer operation on the to-be-parsed logical row. M is variable for each hammering.

It is first determined whether M is 0. In case that a determination result is yes, that is, M is 0, the process returns to operation S1003f to continue to perform the row hammer operation on the to-be-parsed logical row until M is not 0. In case that a determination result is no, that is, M is not 0, then the operation S1003i is performed.

In S1003i, it is determined whether M is less than 2.

It needs to be noted that in case that M is not 0, it is further determined whether M is less than 2. In case that a determination result is yes, that is, M is less than 2, that is, M is 1, the operation S1003j and subsequent operations are performed. That is, the first parsing strategy in the foregoing embodiments is performed.

In case that a determination result is no, M is not less than 2, that is, M is greater than or equal to 2, the second parsing strategy in the foregoing embodiments is performed. For the second parsing strategy, detailed description is provided subsequently.

In S1003j, it is determined whether the flipped logical row exists in the linked list.

It needs to be noted that in this case, there is only one flipped logical row, and it is determined whether the flipped logical row exists in the linked list. In case that a determination result is yes, that is, the flipped logical row exists in the linked list, then the operation S1003k is performed. In case that a determination result is no, that is, the flipped logical row does not exist in the linked list, then the operation S1003l is performed.

In S1003k, it is determined whether the hammering times of performing the row hammer operation on the to-be-parsed logical row is greater than or equal to a preset threshold.

It needs to be noted that the preset threshold is maximum hammering times of performing the row hammer operation on the to-be-parsed logical row, and is used in case that M is 1 for improving the fault tolerance rate of determining whether a to-be-parsed logical row is a boundary logical row.

In case that a determination result is yes, that is, the hammering times is greater than or equal to the preset threshold, the process returns to perform operation S1003d. In case that a determination result is no, that is, the hammering times is less than the preset threshold, the process returns to perform operation S1003f.

In S1003l, it is determined whether the next node of the present node in the linked list is empty.

It needs to be noted that in case that a determination result is yes, that is, the next node of the present node in the linked list is empty, the operation S1003m is performed. In case that a determination result is no, that is, the next node of the present node in the linked list is not empty, the operation S1003n is performed.

In S1003m, the flipped logical row is added to the next node of the present node in the linked list.

In S1003n, the flipped logical row is added to a prior node of the present node in the linked list.

In S1003o, the flipped logical row is pushed onto the stack top of the preset stack.

It needs to be noted that the present node is a node corresponding to the to-be-parsed logical row in the linked list. After the flipped logical row is added to the linked list, the flipped logical row is further pushed onto a stack top of the preset stack. Next, the process returns to perform the operation S1003d.

Figure 13:
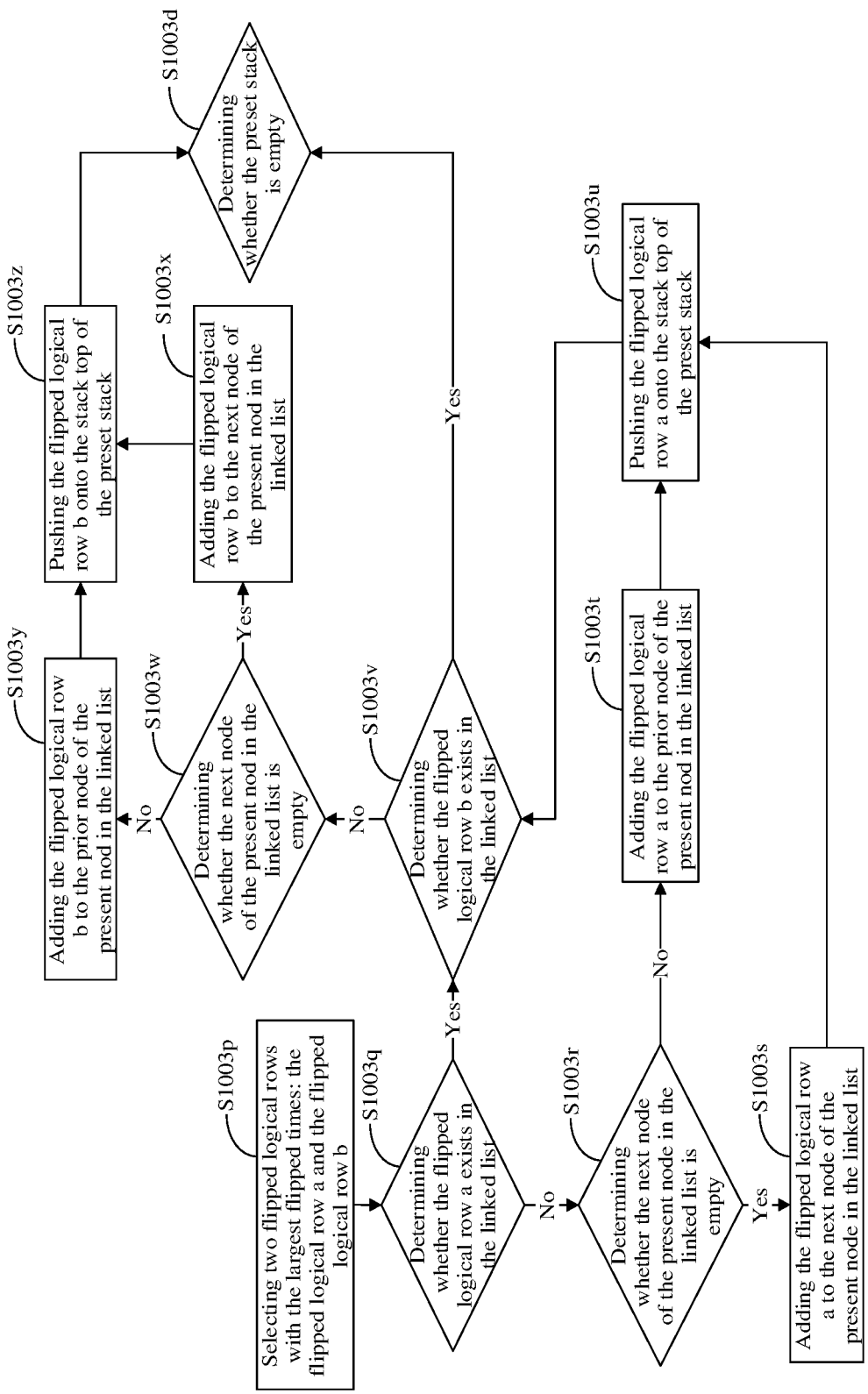
FIG. 13 is a detailed fourth schematic flowchart of a parsing method according to an embodiment of the disclosure.

Further, after the operation S1003i, in case that the determination result of operation S1003i is no, that is, the number of flipped logical rows is greater than or equal to 2, in this case, the foregoing second parsing strategy is performed on the multiple flipped logical rows. Specifically, referring to FIG. 13, FIG. 13 is a detailed fourth schematic flowchart of a parsing method according to the disclosure. The detailed procedure is a detailed description of the second parsing strategy. As illustrated in FIG. 13, the detailed procedure may include the following operations.

In S1003p, two flipped logical rows with the largest flipped times are selected: the flipped logical row a and the flipped logical row b.

It needs to be noted that in case that there are multiple flipped logical rows, two logical rows with the largest flipped times are selected: the flipped logical row a and the flipped logical row b. The flipped times of the flipped logical row a may be greater than the flipped times of the flipped logical row b.

In S1003q, it is determined whether the flipped logical row a exists in the linked list.

It needs to be noted that in case that a determination result is yes, that is, the flipped logical row a exists in the linked list, the operation S1003v is performed. In case that a determination result is no, that is, the flipped logical row a does not exist in the linked list, the operation S1003r is performed.

In S1003r, it is determined whether the next node of the present node in the linked list is empty.

It needs to be noted that in case that a determination result is yes, that is, the next node of the present node in the linked list is empty, the operation S1003s is performed. In case that a determination result is no, that is, the next node of the present node in the linked list is not empty, the operation S1003t is performed.

In S1003s, the flipped logical row a is added to the next node of the present node in the linked list.

In S1003t, the flipped logical row a is added to the prior node of the present node in the linked list.

In S1003u, the flipped logical row a is pushed onto the stack top of the preset stack.

It needs to be noted that after the flipped logical row a is added to the linked list, the flipped logical row a is further pushed onto a stack top of the preset stack.

In S1003v, it is determined whether the flipped logical row b exists in the linked list.

It needs to be noted that in case that a determination result is yes, that is, the flipped logical row b exists in the linked list, the foregoing operation S1003d is performed. In case that a determination result is no, that is, the flipped logical row b does not exist in the linked list, the operation S1003w is performed.

In S1003w, it is determined whether the next node of the present node in the linked list is empty.

It needs to be noted that in case that a determination result is yes, that is, the next node of the present node in the linked list is empty, the operation S1003x is performed. In case that a determination result is no, that is, the next node of the present node in the linked list is not empty, the operation S1003y is performed.

In S1003x, the flipped logical row b is added to the next node of the present node in the linked list.

In S1003y, the flipped logical row b is added to the prior node of the present node in the linked list.

In S1003z, the flipped logical row b is pushed onto the stack top of the preset stack.

It needs to be noted that after the flipped logical row b is added to the linked list, the flipped logical row b is further pushed onto a stack top of the preset stack. Next, the process returns to perform operation S1003d.

In this way, a manner of parsing the target bank is described in detail through the description of operations S1003a to S1003z.

Figure 14:
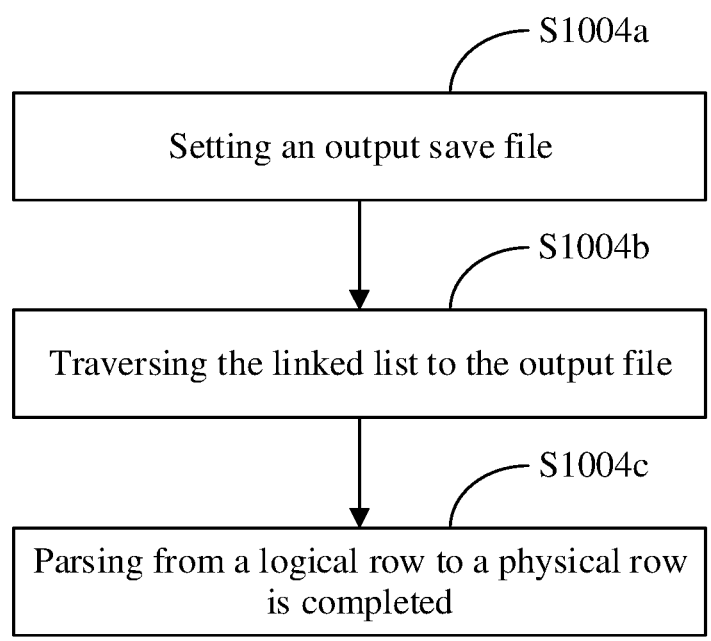
FIG. 14 is a detailed fifth schematic flowchart of a parsing method according to an embodiment of the disclosure.

Further, for operation S1004 in FIG. 11, referring to FIG. 14, FIG. 14 is a detailed fifth schematic flowchart of a parsing method according to an embodiment of the disclosure. The detailed procedure is a detailed description of operation S1004. As illustrated in FIG. 14, the detailed procedure may include the following operations.

In S1004a, an output file is set.

In S1004b, the linked list is traversed to the output file.

In S1004c, parsing from a logical row to a physical row of the target bank is completed.

It needs to be noted that after the target bank has been parsed, the parsing result of the target bank is saved. An output file may be set, and the linked list is traversed to the output file, to complete the parsing from a logical row to a physical row of the target bank, to obtain the target file of the target bank.

Correspondingly, for operation S1005 illustrated in FIG. 11, after all target banks of the memory have been parsed, a target file of each bank can be obtained. All target files are saved, to obtain all mapping relationships from logical rows to physical rows in the memory.

The embodiments of the disclosure provide a parsing method. The specific implementation of the foregoing embodiments are described in detail through the foregoing embodiments. As can be seen, the parsing method provided in the embodiments of the disclosure is used to parse banks in a memory, a single algorithm can acquire physical position relationships of all logical rows in one bank; during parsing from a logical row to a physical row, a row address of the logical row used as a basis is known; the number of logical rows that can be flipped in the boundary logical rows (i.e., the first and last physical rows) in the linked list corresponding to a bank is one. This method innovatively realizes the transform from logical rows to physical rows of the memory, and can efficiently implement the transform of all logical rows to physical rows of all banks in the memory.

Figure 15:
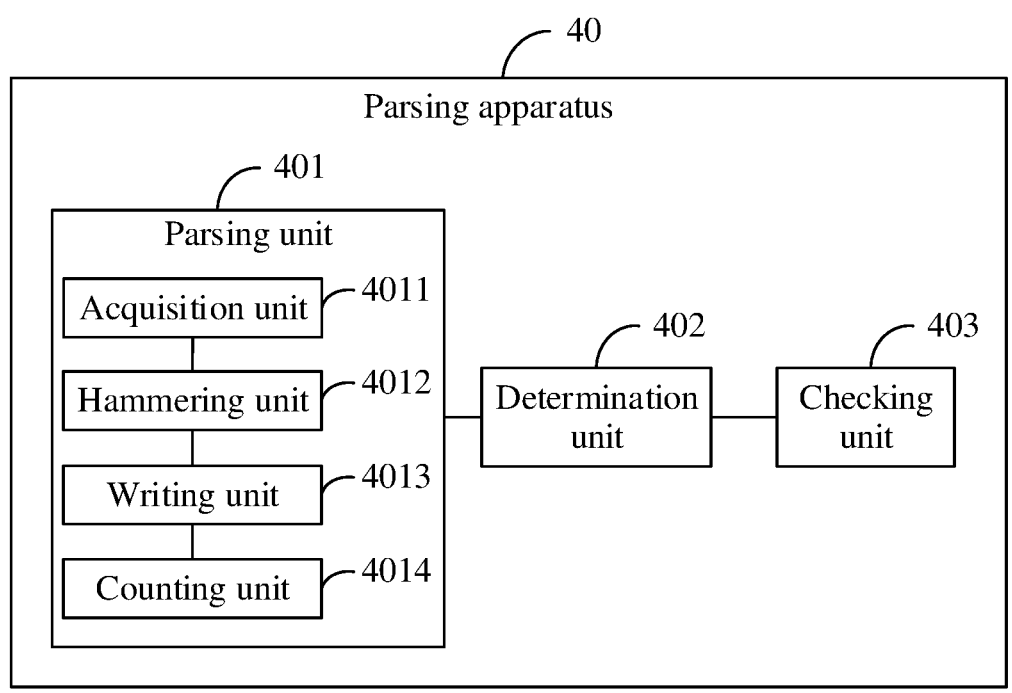
FIG. 15 is a composition structural diagram of a parsing apparatus according to an embodiment of the disclosure.

In still another embodiment of the disclosure, FIG. 15 is a composition structural diagram of a parsing apparatus 40 according to an embodiment of the disclosure. As illustrated in FIG. 15, the apparatus 40 may include a parsing unit 401 and a determination unit 402.

the parsing unit 401 is configured to: in a process of parsing a target bank, perform a row hammer operation on a logical row in the target bank to determine a physical position relationship of the logical row; and repeatedly perform the operation of performing the row hammer operation on the logical row in the target bank to determine the physical position relationship of the logical row until all of multiple logical rows included in the target bank have been parsed; and the determination unit 402 is configured to determine a mapping relationship according to a linked list, the mapping relationship being used for recording physical position relationships of the multiple logical rows, where the parsing unit 401 includes an acquisition unit 4011, a hammering unit 4012, and a writing unit 4013, where the acquisition unit 4011 is configured to acquire a to-be-parsed logical row in the target bank, where the target bank includes the multiple logical rows;

the hammering unit 4012 is configured to perform the row hammer operation on the to-be-parsed logical row until at least one flipped logical row is obtained; and the writing unit 4013 is configured to write the at least one flipped logical row into the linked list.

In some embodiments, the determination unit 402 is further configured to acquire the number of the logical rows in the target bank; and determine a linked list structure of the linked list according to the number of the logical rows in the target bank, where the linked list includes multiple nodes, and the number of the multiple nodes is identical to the number of the logical rows in the target bank.

In some embodiments of the disclosure, the writing unit 4013 is specifically configured to: in case that the at least one flipped logical row includes only a first flipped logical row, write the first flipped logical row into the linked list by using a first parsing strategy; and in case that the at least one flipped logical row includes at least a first flipped logical row and a second flipped logical row, write the first flipped logical row and the second flipped logical row into the linked list by using a second parsing strategy.

In some embodiments of the disclosure, the writing unit 4013 is further specifically configured to: in case that the first flipped logical row does not exist in the linked list, determine a node corresponding to the to-be-parsed logical row in the linked list as a to-be-parsed node; determine whether a next node of the to-be-parsed node is empty; and in case that the next node of the to-be-parsed node is empty, write a row address of the first flipped logical row into the next node of the to-be-parsed node; or in case that the next node of the to-be-parsed node is not empty, write a row address of the first flipped logical row into a prior node of the to-be-parsed node.

In some embodiments, the first flipped logical row and the second flipped logical row are two logical rows with the largest flipped times in the at least one flipped logical row, and the flipped times of the first flipped logical row is greater than or equal to the flipped times of the second flipped logical row; and the writing unit 4013 is further specifically configured to: determine whether the first flipped logical row exists in the linked list; in case that the first flipped logical row does not exist in the linked list, write the first flipped logical row into the linked list; in case that the first flipped logical row exists in the linked list, determine whether the second flipped logical row exists in the linked list; and in case that the second flipped logical row does not exist in the linked list, write the second flipped logical row into the linked list.

In some embodiments of the disclosure, the writing unit 4013 is further specifically configured to: determine a node corresponding to the to-be-parsed logical row in the linked list as a to-be-parsed node; determine whether a next node of the to-be-parsed node is empty; and in case that the next node of the to-be-parsed node is empty, write a row address of the first flipped logical row into the next node of the to-be-parsed node; or in case that the next node of the to-be-parsed node is not empty, write a row address of the first flipped logical row into a prior node of the to-be-parsed node.

In some embodiments of the disclosure, the writing unit 4013 is further specifically configured to: determine a node corresponding to the to-be-parsed logical row in the linked list as a to-be-parsed node; determine whether a next node of the to-be-parsed node is empty; and in case that the next node of the to-be-parsed node is empty, write a row address of the second flipped logical row into the next node of the to-be-parsed node; or in case that the next node of the to-be-parsed node is not empty, write a row address of the second flipped logical row into a prior node of the to-be-parsed node.

In some embodiments, as illustrated in FIG. 15, the parsing unit 401 may further include a counting unit 4014, configured to: in case that the at least one flipped logical row includes only the first flipped logical row and the first flipped logical row does not exist in the linked list, count hammering times of performing the row hammer operation on the to-be-parsed logical row; determine whether the hammering times is greater than or equal to a preset threshold, where the preset threshold is maximum hammering times of performing the row hammer operation on the to-be-parsed logical row; and in case that the hammering times is less than the preset threshold, continue to perform the operation of performing the row hammer operation on the to-be-parsed logical row until at least one flipped logical row is obtained; or in case that the hammering times is greater than or equal to the preset threshold, return to perform the operation of acquiring a to-be-parsed logical row in the target bank.

In some embodiments of the disclosure, the acquisition unit 4011 is specifically configured to: pop a stack top element from a preset stack to acquire the to-be-parsed logical row in the target bank, where the stack top element represents the to-be-parsed logical row in the target bank.

In some embodiments, in case that the to-be-parsed logical row is the first parsed logical row in the target bank, the writing unit 4013 is further specifically configured to: after the preset stack is initialized, randomly select one logical row from the target bank as the to-be-parsed logical row, and push this to-be-parsed logical row onto a stack top of the preset stack.

In some embodiments of the disclosure, the writing unit 4013 is further specifically configured to: push the flipped logical row written into the linked list onto a stack top of the preset stack.

In some embodiments, as illustrated in FIG. 15, the parsing apparatus 40 may further include a checking unit 403, configured to separately write preset data into the multiple logical rows, where the preset data is used for determining whether the logical row is flipped.

In some embodiments of the disclosure, the determination unit 402 is specifically configured to: set an output file; and traverse the linked list to the output file, to obtain a target file in the target bank, where the target file stores the physical position relationships of the multiple logical rows recorded in the mapping relationship.

In some embodiments, the parsing apparatus 40 is applied to a memory, the memory includes at least one bank, and the target bank is any one of the at least one bank. Correspondingly, the determining unit 402 is further configured to: determine whether all of the at least one bank have been parsed; in case that all of the at least one bank have been parsed, save target files of all banks; and in case that unparsed banks exists in the at least one bank, determine a target bank from the unparsed banks, and return to the operation of performing a row hammer operation on a logical row in the target bank to determine a physical position relationship of the logical row until all of the at least one bank have been parsed.

It may be understood that in the disclosure, a "unit" may be a part of a circuit, a part of a processor, a part of a program or software, or the like, or certainly may be a module or may be non-modular. In addition, the components in the disclosure may be integrated into one processing unit, or each of the units may exist alone physically, or two or more units are integrated into one unit. The integrated unit may be implemented in the form of hardware or a software functional module.

When the integrated units are implemented in the form of a software functional module and sold or used as an independent product, the integrated unit may be stored in a computer-readable storage medium. Based on such an understanding, the technical solutions in the disclosure essentially, or the part contributing to some implementations, or all or some of the technical solutions may be implemented in the form of a software product. The software product is stored in a storage medium and includes several instructions for instructing a computer device (which may be a personal computer, a server, a network device or the like) or a processor to perform all or some of the steps of the method described in the disclosure. The foregoing storage medium includes various media that can store program code, such as a Universal Serial Bus (USB) flash drive, a removable hard disk, a Read-Only Memory (ROM), a Random Access Memory (RAM), a magnetic disk or an optical disk.

Therefore, the disclosure provides a computer storage medium having stored thereon a computer program that when executed by at least one processor, implements the operations of the parsing method in any foregoing embodiment.

Figure 16:
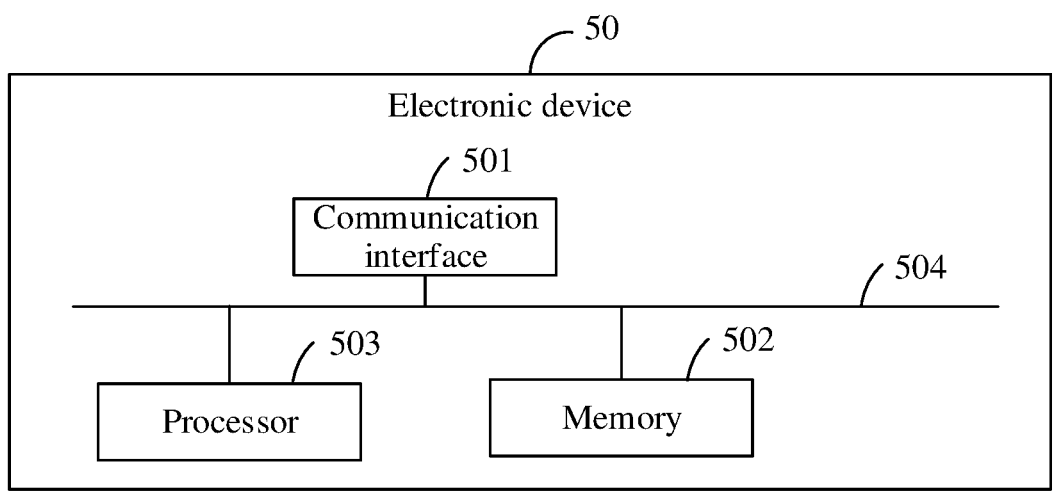
FIG. 16 is a composition structural diagram of an electronic device according to an embodiment of the disclosure.

Based on the foregoing computer storage medium, FIG. 16 is a composition structural diagram of an electronic device 50 according to an embodiment of the disclosure. As illustrated in FIG. 16, the electronic device may include a communication interface 501, a memory 502, and a processor 803. The components are coupled together by a bus system 504. It may be understood that the bus system 504 is configured to implement connection and communication among these components. The bus system 504 further includes a power bus, a control bus, and a status signal bus in addition to a data bus. However, for clear description, various buses in FIG. 16 are illustrated as the bus system 504. The communication interface 501 is configured to receive and transmit signals when receiving information from or transmitting information to another external network element.

The memory 502 is configured to store a computer program runnable on the processor 503.

The processor 503 is configured to, when running the computer program:

in a process of parsing a target bank, perform a row hammer operation on a logical row in the target bank to determine a physical position relationship of the logical row, where the operation of performing the row hammer operation on the logical row in the target bank to determine the physical position relationship of the logical row may include that:

a to-be-parsed logical row in the target bank is acquired, where the target bank includes the multiple logical rows;

the row hammer operation on the to-be-parsed logical row is performed until at least one flipped logical row is obtained; and the at least one flipped logical row is written into the linked list;

the operation of performing the row hammer operation on the logical row in the target bank to determine the physical position relationship of the logical row is repeatedly performed until all of multiple logical rows have been parsed; and a mapping relationship is determined according to a linked list, the mapping relationship being used for recording physical position relationships of the multiple logical rows.

It may be understood that the memory 502 in the disclosure may be a volatile storage or a nonvolatile storage or may include both a volatile storage and a nonvolatile storage. The nonvolatile storage may be a ROM, a programmable ROM (PROM), an erasable programmable PROM (EPROM), an electrically EPROM (EEPROM) or a flash memory. The volatile storage may be a RAM used as an external cache. By way of example rather than limitation, many forms of RAMs such as a static RAM (SRAM), a Dynamic RAM (DRAM), a synchronous DRAM (SDRAM), a double-data-rate SDRAM (DDR SDRAM), an enhanced SDRAM (ESDRAM), a synchronous-link DRAM (SLDRAM), and a Direct Rambus RAM (DRRAM) may be used. The memory 502 in the system and method described herein intends to include, but not limited to, these and any other appropriate types of storages.

The processor 503 may be an integrated circuit chip having a signal processing capability. During implementation, the steps in the foregoing method may be accomplished by hardware integrated logic circuits or instructions in a software form in the processor 503. The processor 503 may be a general-purpose processor, a digital signal processor (DSP), an application-specific integrated circuit (ASIC), a field-programmable gate array (FPGA) or another programmable logic device, discrete gate or transistor logic device, a discrete hardware component. The methods, steps, and logic block diagrams in the disclosure can be implemented or executed. The general-purpose processor may be a microprocessor or the processor may be any conventional processor or the like. The steps in the method with reference to the disclosure may be directly performed and accomplished by a hardware decoding processor or performed and accomplished by a combination of hardware and software modules in a decoding processor. The software modules may be located in a mature storage medium such as a RAM, a flash memory, a ROM, a PROM or an electrically erasable programmable memory or a register in the art. The storage medium is located in the memory 502. The processor 503 reads information in the memory 502 and accomplishes the steps in the foregoing method in combination with hardware of the processor.

It may be understood that these embodiments described herein may be implemented by hardware, software, firmware, middleware, microcode or a combination thereof. For hardware implementation, a processing unit may be implemented in one or more ASICs, a DSP, a DSP device (DSPD), a programmable logic device (PLD), a field-programmable gate array (FPGA), a general-purpose processor, a controller, a microcontroller, a microprocessor, another electronic unit configured to perform the functions in the disclosure or a combination thereof.

For software implementation, the technologies herein may be implemented by using modules (for example, processes or functions) that perform the functions herein. Software code may be stored in a memory and executed by a processor. The memory may be implemented in the processor or outside the processor.

Optionally, in another embodiment, the processor 503 is further configured to, when running the computer program, perform the parsing method in any foregoing embodiment.

In the embodiments of the disclosure, because the electronic device 50 may include the foregoing parsing apparatus 40, so that the row hammer operation can be performed on the logical row in the target bank to determine the physical position relationship of the logical row. In this way, the electronic device 50 may perform a row hammer operation on a to-be-parsed logical row, and an obtained flipped logical row is written into a linked list, physical position relationships of logical rows in a memory can be obtained, thereby implementing accurate parsing of the physical position relationships of the logical rows in the memory, so that the transform from a logical row into a physical row of the memory can be implemented.

The foregoing is merely preferred embodiments of the disclosure but is not used to limit the scope of protection of the disclosure.

It should be noted that the terms "include", "comprise", or any variation thereof in the disclosure are intended to cover a non-exclusive inclusion. Therefore, in the context of a process, method, object or apparatus that includes a series of elements, the process, method, object or apparatus not only includes such elements, but also includes other elements not specified expressly, or may include inherent elements of the process, method, object or apparatus. If no more limitations are made, an element limited by "include a/an . . . " does not exclude other same elements existing in the process, the method, the object or the apparatus which includes the element.

The foregoing sequence numbers in the disclosure are merely for the convenience of description, and do not imply the preference among the embodiments.

The methods disclosed in several method embodiments provided in the disclosure may be arbitrarily combined with each other without causing any conflict to obtain new method embodiments.

The features disclosed in several product embodiments provided in the disclosure may be arbitrarily combined with each other without causing any conflict to obtain new product embodiments.

The features disclosed in several method or device embodiments provided in the disclosure may be arbitrarily combined with each other without causing any conflict to obtain new method embodiments or device embodiments.

The foregoing descriptions are merely specific implementations of the disclosure, but are not intended to limit the protection scope of the disclosure. Any variation or replacement that may be readily figured out by a person skilled in the art within the technical scope disclosed in the disclosure shall fall within the protection scope of the disclosure. Therefore, the protection scope of the disclosure shall be subject to the protection scope of the claims.

In the embodiments of the disclosure, in a process of parsing a target bank, a row hammer operation is performed on a logical row in the target bank to determine a physical position relationship of the logical row; the operation of performing the row hammer operation on the logical row in the target bank to determine the physical position relationship of the logical row is repeatedly performed until all of multiple logical rows have been parsed; and a mapping relationship is determined according to a linked list, the mapping relationship being used for recording physical position relationships of the multiple logical rows, where the operation of performing the row hammer operation on the logical row in the target bank to determine the physical position relationship of the logical row includes that: a to-be-parsed logical row in the target bank is acquired, where the target bank includes the multiple logical rows; the row hammer operation is performed on the to-be-parsed logical row until at least one flipped logical row is obtained; and the at least one flipped logical row is written into the linked list. In this way, based on the characteristic that a row hammer operation causes a row physically adjacent to a hammered row to flip, a row hammer operation is performed on a to-be-parsed logical row, and an obtained flipped logical row is written into a linked list, then a physical position relationship of a logical row of a memory can be obtained, thereby implementing accurate parsing of the physical position relationship of the logical row of the memory, so that the transform of a logical row of the memory into a physical row can be implemented.

What is claimed is:

1. A parsing method, comprising:
   in a process of parsing a target bank, performing a row hammer operation on each logical row in the target bank to determine a physical position relationship of the logical row until all of a plurality of logical rows comprised in the target bank have been parsed, the physical position relationship being a mapping relationship from the logical row to a physical row in the target bank; and
   determining the mapping relationship according to a linked list, the mapping relationships of the plurality of logical rows being used for recording physical position relationships of the plurality of logical rows,
   wherein performing the row hammer operation on the logical row in the target bank to determine the physical position relationship of the logical row comprises:
   acquiring a to-be-parsed logical row in the target bank, wherein the target bank comprises a plurality of logical rows;
   performing the row hammer operation on the to-be-parsed logical row until at least one flipped logical row is obtained; and
   writing a row address of the at least one flipped logical row into the linked list.

2. The method according to claim 1, further comprising:
   acquiring a number of logical rows in the target bank; and
   determining a linked list structure of the linked list according to the number of the logical rows in the target bank, wherein the linked list comprises a plurality of nodes, and a number of the plurality of nodes is identical to the number of the logical rows in the target bank.

3. The method according to claim 1, wherein writing the row address of the at least one flipped logical row into the linked list comprises:

in case that the at least one flipped logical row comprises only a first flipped logical row, writing a row address of the first flipped logical row into the linked list by using a first parsing strategy; or
in case that the at least one flipped logical row comprises at least a first flipped logical row and a second flipped logical row, writing row addresses of the first flipped logical row and the second flipped logical row into the linked list by using a second parsing strategy.

4. The method according to claim 3, wherein writing the row address of the first flipped logical row into the linked list by using the first parsing strategy comprises:
   in case that the first flipped logical row does not exist in the linked list, determining a node corresponding to the to-be-parsed logical row in the linked list as a to-be-parsed node;
   determining whether a next node of the to-be-parsed node is empty; and
   in case that the next node of the to-be-parsed node is empty, writing the row address of the first flipped logical row into the next node of the to-be-parsed node; or
   in case that the next node of the to-be-parsed node is not empty, writing the row address of the first flipped logical row into a prior node of the to-be-parsed node.

5. The method according to claim 3, wherein the first flipped logical row and the second flipped logical row are two logical rows with a largest flipped times among the at least one flipped logical row, and flipped times of the first flipped logical row is greater than or equal to flipped times of the second flipped logical row; and
   the writing the row addresses of the first flipped logical row and the second flipped logical row into the linked list by using a second parsing strategy comprises:
   determining whether the first flipped logical row exists in the linked list;
   in case that the first flipped logical row does not exist in the linked list, writing the row address of the first flipped logical row into the linked list;
   in case that the first flipped logical row exists in the linked list, determining whether the second flipped logical row exists in the linked list; and
   in case that the second flipped logical row does not exist in the linked list, writing the row address of the second flipped logical row into the linked list.

6. The method according to claim 5, wherein the writing the row address of the first flipped logical row into the linked list comprises:
   determining a node corresponding to the to-be-parsed logical row in the linked list as a to-be-parsed node;
   determining whether a next node of the to-be-parsed node is empty; and
   in case that the next node of the to-be-parsed node is empty, writing the row address of the first flipped logical row into the next node of the to-be-parsed node; or
   in case that the next node of the to-be-parsed node is not empty, writing the row address of the first flipped logical row into a prior node of the to-be-parsed node.

7. The method according to claim 5, wherein the writing the row address of the second flipped logical row into the linked list comprises:
   determining a node corresponding to the to-be-parsed logical row in the linked list as a to-be-parsed node;
   determining whether a next node of the to-be-parsed node is empty; and in case that the next node of the to-be-parsed node is empty, writing the row address of the second flipped logical row into the next node of the to-be-parsed node; or in case that the next node of the to-be-parsed node is not empty, writing the row address of the second flipped logical row into a prior node of the to-be-parsed node.

8. The method according to claim 3, wherein in case that the at least one flipped logical row comprises only the first flipped logical row and the first flipped logical row does not exist in the linked list, the method further comprises:

counting hammering times of performing the row hammer operation on the to-be-parsed logical row;

determining whether the hammering times is greater than or equal to a preset threshold, wherein the preset threshold is a maximum hammering times of performing the row hammer operation on the to-be-parsed logical row; and in case that the hammering times is less than the preset threshold, continuing to perform the operation of performing the row hammer operation on the to-be-parsed logical row until at least one flipped logical row is obtained; or in case that the hammering times is greater than or equal to the preset threshold, returning to perform the operation of acquiring the to-be-parsed logical row in the target bank.

9. The method according to claim 1, wherein the acquiring the to-be-parsed logical row in the target bank comprises:

popping a stack top element from a preset stack to acquire the to-be-parsed logical row in the target bank, wherein the stack top element represents the to-be-parsed logical row in the target bank.

10. The method according to claim 9, wherein in case that the to-be-parsed logical row is the first parsed logical row in the target bank, before popping the stack top element from the preset stack to acquire the to-be-parsed logical row in the target bank, the method further comprises:

after initializing the preset stack, randomly selecting one logical row from the target bank as the to-be-parsed logical row, and pushing the to-be-parsed logical row onto a stack top of the preset stack.

11. The method according to claim 9, wherein in the process of writing the row address of the at least one flipped logical row into the linked list, the method further comprises:

pushing the flipped logical row of which the row address is written into the linked list onto a stack top of the preset stack.

12. The method according to claim 1, wherein before parsing the target bank, the method further comprises:

separately writing preset data into the plurality of logical rows, wherein the preset data is used for determining whether the logical rows are flipped.

13. The method according to claim 1, wherein determining the mapping relationship according to the linked list comprises:

setting an output file; and traversing the linked list to the output file, to obtain a target file in the target bank, wherein the target file stores the physical position relationships of the plurality of logical rows recorded in the mapping relationship.

14. The method according to claim 13, wherein the method is applied to a memory, the memory comprises at least one bank, and the target bank is any one of the at least one bank; and the method further comprises:

determining whether all of the at least one bank have been parsed;

in case that all of the at least one bank have been parsed, saving target files of all banks;

in case that unparsed banks exist in the at least one bank, determining a target bank from the unparsed banks, and returning to perform the operation of performing the row hammer operation on the logical row in the target bank to determine the physical position relationship of the logical row until all of the at least one bank have been parsed.

15. A parsing apparatus, comprising:

a processor; and a memory configured to store a computer-executable instruction;

wherein the processor is configured to:

in a process of parsing a target bank, perform a row hammer operation on each logical row in the target bank to determine a physical position relationship of the logical row until all of a plurality of logical rows comprised in the target bank have been parsed, the physical position relationship being a mapping relationship from the logical row to a physical row in the target bank; and determine the mapping relationship according to a linked list, mapping relationships of the plurality of logical rows being used for recording physical position relationships of the plurality of logical rows, wherein the processor is further configured to:

acquire a to-be-parsed logical row in the target bank, wherein the target bank comprises a plurality of logical rows;

perform the row hammer operation on the to-be-parsed logical row until at least one flipped logical row is obtained; and write a row address of the at least one flipped logical row into the linked list.

16. The parsing apparatus according to claim 15, wherein the processor is further configured to:

acquire a number of logical rows in the target bank; and determine a linked list structure of the linked list according to the number of the logical rows in the target bank, wherein the linked list comprises a plurality of nodes, and a number of the plurality of nodes is identical to the number of the logical rows in the target bank.

17. The parsing apparatus according to claim 15, wherein the processor is further configured to:

in case that the at least one flipped logical row comprises only a first flipped logical row, write a row address of the first flipped logical row into the linked list by using a first parsing strategy; or in case that the at least one flipped logical row comprises at least a first flipped logical row and a second flipped logical row, write row addresses of the first flipped logical row and the second flipped logical row into the linked list by using a second parsing strategy.

18. The parsing apparatus according to claim 17, wherein the processor is further configured to:

in case that the first flipped logical row does not exist in the linked list, determine a node corresponding to the to-be-parsed logical row in the linked list as a to-be-parsed node;

determine whether a next node of the to-be-parsed node is empty; and in case that the next node of the to-be-parsed node is empty, write the row address of the first flipped logical row into the next node of the to-be-parsed node; or in case that the next node of the to-be-parsed node is not empty, write the row address of the first flipped logical row into a prior node of the to-be-parsed node.

19. The parsing apparatus according to claim 17, wherein the first flipped logical row and the second flipped logical row are two logical rows with a largest flipped times among the at least one flipped logical row, and flipped times of the first flipped logical row is greater than or equal to flipped times of the second flipped logical row; and
   wherein the processor is further configured to:
   determine whether the first flipped logical row exists in the linked list;
   in case that the first flipped logical row does not exist in the linked list, write the row address of the first flipped logical row into the linked list;
   in case that the first flipped logical row exists in the linked list, determine whether the second flipped logical row exists in the linked list; and
   in case that the second flipped logical row does not exist in the linked list, write the row address of the second flipped logical row into the linked list.

20. A non-transitory computer storage medium having stored thereon a computer program that when executed by at least one processor, implements a parsing method, wherein the parsing method comprise:

in a process of parsing a target bank, performing a row hammer operation on each logical row in the target bank to determine a physical position relationship of the logical row until all of a plurality of logical rows comprised in the target bank have been parsed, the physical position relationship being a mapping relationship from the logical row to a physical row in the target bank; and determining the mapping relationship according to a linked list, the mapping relationships of the plurality of logical rows being used for recording physical position relationships of the plurality of logical rows, wherein performing the row hammer operation on the logical row in the target bank to determine the physical position relationship of the logical row comprises:

acquiring a to-be-parsed logical row in the target bank, wherein the target bank comprises a plurality of logical rows;

performing the row hammer operation on the to-be-parsed logical row until at least one flipped logical row is obtained; and writing a row address of the at least one flipped logical row into the linked list.

\* \* \* \* \*